(12) United States Patent
Webb

(10) Patent No.: US 11,657,434 B2
(45) Date of Patent: May 23, 2023

(54) SYSTEM AND METHOD FOR AUTOMATED FRACTIONAL OR UNDIVIDED INTEREST VALUATION

(71) Applicant: Primus PVX LLC, Los Angeles, CA (US)

(72) Inventor: Dennis Arthur Webb, Denver, CO (US)

(73) Assignee: Primus PVX LLC, Los Angeles, CA (US)

( * ) Notice: Subject to any disclaimer, the term of this patent is extended or adjusted under 35 U.S.C. 154(b) by 625 days.

(21) Appl. No.: 16/305,837

(22) PCT Filed: May 31, 2017

(86) PCT No.: PCT/US2017/035305
§ 371 (c)(1),
(2) Date: Nov. 29, 2018

(87) PCT Pub. No.: WO2017/210357
PCT Pub. Date: Dec. 7, 2017

(65) Prior Publication Data
US 2019/0213645 A1    Jul. 11, 2019

Related U.S. Application Data

(60) Provisional application No. 62/343,755, filed on May 31, 2016.

(51) Int. Cl.
*G06Q 50/16* (2012.01)
*G06Q 30/02* (2023.01)
*G06Q 40/02* (2023.01)

(52) U.S. Cl.
CPC ......... *G06Q 30/0278* (2013.01); *G06Q 40/02* (2013.01); *G06Q 50/167* (2013.01)

(58) Field of Classification Search
CPC .................................................. G06Q 30/0278
See application file for complete search history.

(56) References Cited

U.S. PATENT DOCUMENTS

| | | | |
|---|---|---|---|
| 2002/0013750 A1 | 1/2002 | Roberts et al. | |
| 2008/0046353 A1* | 2/2008 | Poltorak | G06Q 40/04 705/37 |
| 2010/0063921 A1 | 3/2010 | Flaherty | |

(Continued)

OTHER PUBLICATIONS

Davis et al. "The Valuation of Partial Interests in Real Estate" (Year: 1983).*

(Continued)

*Primary Examiner* — Aryan E Weisenfeld
(74) *Attorney, Agent, or Firm* — Brian J. Colandreo; Jeffery T. Placker; Holland & Knight LLP

(57) ABSTRACT

Systems and methods for generating a valuation, including: a processor (2); a non-transitory computer readable storage device (8) in data communication (14) with the processor and having encoded thereon computer executable instructions which, when executed on the processor, implement: a graphical user interface (201) for interacting with a user for receiving information including fractional interest information; and a valuation engine (205) for generating a valuation discount for a fractional interest in real estate, in response to said fractional interest information.

21 Claims, 33 Drawing Sheets

(56) References Cited

U.S. PATENT DOCUMENTS

2010/0198714 A1    8/2010  Orfano
2012/0005109 A1*   1/2012  Stinson .................. G06Q 30/02
                                                    705/306

OTHER PUBLICATIONS

International Search Report issued in PCT Application Serial No. PCT/US2017/035305 dated Aug. 29, 2017.

* cited by examiner

FIG. 5

ABOUT PVX
CONTACT US
NEWS & EVENTS
TERMS OF USE

TUTORIAL
MY ACCOUNT
SUBSCRIBE
DASHBOARD
SEARCH

MY PROJECTS  DASHBOARD  PROFILE SETTINGS  RESOURCES  SIGN OUT

HOW DOES IT WORK FOR YOU?

- Guides you through the fact checklists one step at a time
- Five categories organize the analysis for you
- A complex algorithm gives you instant results
- Three levels of analysis fit your speed and reliability goals
- On site references flag special situations and keep you safe
- Build confidence and knowledge and trust your results

PVX

FIG. 6

|                          |                                      |
|-------------------------:|:-------------------------------------|
|                          | [_____] [Create New] ─701  |
|                  Copy ⓘ  | New Project ▾                        |
|        Project Name* ⓘ   | [_____] ─702               |
|                Note 1 ⓘ  | [_____]                    |
|                          | ⊕ Add Note                           |
|         Entity Type* ⓘ   | Please select from the list ▾ ─703   |
|       Property Type* ⓘ   | Please select from the list ▾ ─704   |
|             Interest* ⓘ  | X.XXXX% ─705                         |
|              Parties* ⓘ  | X ─706                               |
|            EST Value* ⓘ  | XX,XXX,XXX ─707                      |
|        Date of Value* ⓘ  | MM/DD/YYYY ─708                      |

I have reviewed the Documents Checklist ☐ ─709

Cancel  [ Create ] ─710

FIG. 7

Page 1

BEFORE YOU START ←801a

This short article addresses the depth of your analysis, common tenancy interest transactions, court cases, special situations, and document and information checklists.

Inroduction

Fractional interest valuation requires that you assemble documents that identify and support the owned assets, the organization structure, operating history and forecasts, and an understanding of the parties involved, their relationship, desires and expectations, and anything else *you would require were you to be considering the acquisition of the interest you are valuing.* This is really the (hypothetical) buyer's due diligence.

You may approach this process at three levels of reliability: ←802a

Level 1 only requires that you fill in the fields in the Create New window and accept the system defaults. Although the defaults represent typical ownership structures, facts & circumstances, they are by no means true for *your* case. The resulting value and discount are not reliable at this point, but they are a starting point.

Level 2 requires that you review the most important documents, make an initial cut at refining the facts and make necessary adjustments. You might be able to do this by just discussing the case with the client, general partner, attorney or CPA that has been involved with the property and owners. Of course, it is necessary to know which are the important questions to ask; these are contained in the dialogue of the five Properties windows. You will become more familiar with this the more you use PVX. The resulting value and discount *might* be reliable at this point.

Level 3 is necessary for professional valuer/users and strongly suggested for adviser/ users, since it is an in-depth analysis of all facts, circumstances and supporting information, and will result in the most reliable value indication.

It is usually most logical to progress through the Properties Windows from left to right. This it is not absolutely necessary, but you will find that information developed in one window is needed for the next, and such a progression will be the easiest.

FIG. 8A

Page 1

Document and Information Checklists ← 801b

Not all items are required for every case.

Some might be required but also might not exist in document form, which will require that you obtain the information with a more detailed request. Please review the sections asking for the information and then formulate your document request.

If you have access to someone with someone who is very familiar with the property and its ownership, you may be able to obtain enough information for Level 1 and Level 2 analysis through a simple interview. You will need the source documents for your Level 3 analysis.

*Level 1 Interview Checklist* ← 802b

- ☐ Are you valuing a very large (over 70%) tenancy-in-common interest (special condition)?

- ☐ Does the property produce cash flow? If not, go to Level 2.

- ☐ Can the interest cause sale of the property and distribution of the proceeds? If so, the discount might be zero.

- ☐ Does the entity hold a non-controlling interest in another entity (special condition)?

- ☐ Does the entity hold significant non-real estate assets (special condition)?

- ☐ If tenancy-in-common but with an operating agreement that prohibits partition, change the entity type to a general partnership (for valuation purposes) if the agreement still allows limited control, or to a limited partnership if the agreement severely limits control.

*Level 2 Interview Checklist*

In addition to the Level 1 questions:

- ☐ Estimate a capitalization rate and growth rate for the property and enter in the Real Estate window.

- ☐ If the property does not produce cash flow, zero the cash flow field in the Entity window.

FIG. 8B

| My Projects | | | | | |
|---|---|---|---|---|---|
| All Entities (6) ▼ | All Properties (9) ▼ | Interest | Est Value | Date of Value | User Valuation Summaries ⓘ |
| Blair - Third Ave Colorado | Limited Partnership | Office Suburban | 32% | 5,700,000 | 12/24/2015 | Load | View | Download |
| The Blair Project | General Partnership | Office Suburban | 32% | 5,700,000 | 12/24/2015 | Load | View | Download |
| The Which Blair? Project | General Partnership | Office CBD | 15% | 19,900,000 | 12/24/2015 | Load | View | Download |

Showing 1 to 3 of 3 entries

Previous | 1 | Next

FIG. 23

2402 — User Valuation Summary

2401

A 32% interest, one of 4 partners
Holds a Office Suburban valued at $ 5,700,000
Date of value December 24, 2015
Concluded discount 43.2%

[Description - What PVX does, user responsibilities]

Please remember that § 1(b) of the Terms of Use states that: You represent, warrant and covenant ("Warranty" or "warrant") that: you are a "Qualified Appraiser" (as this term is defined by the U.S. Internal Revenue Service, judicial and other applicable authority; you intend to use App solely to obtain information and analysis that you intend to use in your appraisal reports and to support your opinion of value for real estate; you acknowledge and understand that the App supplies useful information, but that the responsibility for the entire content of any report of yours and opinion of value is yours alone (in conformance with the Uniform Standards of Professional Appraisal Practice and other applicable professional standards); you will take all necessary steps to assure that your work is suitable for the specific appraisal purpose and use including but not limited to, the requirement that your work be unbiased and not misleading to the intended user; and, you acknowledge and understand that you must understand all information output by the App or will take all steps necessary to acquire such competence prior to issuing any report or opinion of value for real estate.

And also §15 states that:

(a) THE APP IS ONLY A REFERENCE AND TEACHING TOOL THAT PROVIDES INSIGHT INTO FRACTIONAL INTERESTS IN REAL ESTATE (SUCH AS IN LLCs AND TENANCIES IN COMMON THAT OWN REAL ESTATE AS A PRINCIPAL ASSET), AND THEIR VALUATIONS. IT IS FOR GENERAL EDUCATIONAL PURPOSES ONLY. IT MAY OR MAY NOT BE SPECIFIC TO YOUR PARTICULAR SITUATION. IT IS NOT A VALUATION REPORT AND IS NOT AND CANNOT BE USED AS A QUALIFIED APPRAISAL BY A QUALIFIED APPRAISER INCLUDING WITHOUT LIMITATION, AS DESCRIBED IN IRS PUBLICATION 561. IT MERELY PROVIDES AN INDICATION OF VALUE FOR PLANNING AND GENERAL UNDERSTANDING PURPOSES ONLY. IT IS NOT A SUBSTITUTE FOR COMPETENT, EXPERIENCED TAX OR REAL ESTATE LEGAL ADVICE. IT ALSO IS NOT INTENDED TO AND DOES NOT APPRAISE REAL ESTATE. IT IS ALSO NOT A SUBSTITUTE FOR USE OF A QUALIFIED APPRAISER/VALUATION EXPERT, AS REQUIRED BY THE INTERNAL REVENUE SERVICE, VARIOUS FEDERAL AND STATE COURTS, STATUTES, PROFESSIONAL STANDARDS AND REGULATIONS PROMULGATED BY OTHER JURISDICTIONAL BODIES. IT IS THE APPRAISERS' RESPONSIBILITY TO DETERMINE THEIR QUALIFICATION UNDER THE MEANING OF APPLICABLE STANDARDS AND REGULATIONS FOR PROVIDING SUITABLY RELIABLE OPINIONS OF VALUE FOR FRACTIONAL INTERESTS IN REAL ESTATE.

(b) A USER CAN GET INCORRECT OR INACCURATE RESULTS FROM ITS USE OF THE APP DUE TO HUMAN ERROR (AN EXAMPLE OF WHICH IS INCOMPLETE OR INACCURATE DATA INPUT), MECHANICAL ERROR, EXTREME OR INCOMPATIBLE COMBINATIONS OF INPUT VARIABLES OR OTHER FACTORS.

(c) THE APP IS NOT APPLICABLE AND WILL NOT GIVE ACCURATE RESULTS FOR TIERED ENTITIES AND OTHER SPECIAL SITUATIONS AND CIRCUMSTANCES THAT ARE DESCRIBED ON THE WEBSITE THE SPECIAL SITUATIONS LIST AND DESCRIPTIONS ARE INTENDED TO BE A GUIDE TO THE TYPES OF CONDITIONS THAT CANNOT BE ACCOMMODATED BY THE APP, BUT NO REPRESENTATION OR WARRANTY THAT THIS LIST IS COMPLETE IS INTENDED.

FIG. 24

| | |
|---|---|
| Working capital | *If an actual balance sheet, is the working capital reasonably needed to support property operations, or is it unusually high or low? (You may need to consult with the owner, property manager or a real estate appraiser.) If unusual, describe the assets and liabilities that make up working capital (current assets less current liabilities).* ~ 2501<br>MORE ...<br>There are no current liabilities, so working capital is essentially the bank balance. This is about four months' rent, which should cover the partners if there was a vacancy due to new construction in the district. The manager thinks that this might be low if they lose two or more tenants. ~ 2502 |
| Other assets/liabilities | *What is included in ether assets and liabilities?*<br>MORE ...<br>These are simply deposits and security deposits. |
| Loan conditions | *Describe any special loan conditions (i.e. variable interest rate, prepayment penalties, conditions on changing members or partners) affecting the ability to transfer the property, make changes to the entity or refinance the loan.*<br>MORE ...<br>The loan was made seven years ago, with a fixed rate and eight years remaining. I have not calculated the balloon payment that will be due at that time. |
| Real estate value | *Describe how you arrived at the concluded real estate value. If you changed any of the defaults, particularly the cash flow item, describe how you arrived at the changed values.*<br>MORE ...<br>All variables are within the necessary parameters. |
| Entity Advanced | *Balance sheet and cash flows may be modeled by valuation practitioners if using the advanced feature. Enter the balance items here directly based on the offline balance sheet.* 2503<br>MORE ... |

| Values | Balance Sheet | | | Mortgage Assumptions | |
|---|---|---|---|---|---|
| | Assets | $ 5,700,000 | 100.0% | Original amount | $ 0 |
| | Working capital | $ 0 | 0.0% | Interest Rate | 0.0% |
| | Other assets | $ 0 | 0.0% | Payment | 0 |
| | Total assets | $ 5,700,000 | 100.0% | Loan term | 180 Mos |
| | Mortgage loan | $ 0 | 0.0% | Type | Fixed |
| | Other liabilities | $ 0 | 0.0% | Amortization | 360 Mos |
| | Total liabilities | $ 0 | 0.0% | Term mos. | 180 |
| | Equity/ Net Asset Value | $ 5,700,000 | 100.0% | Loan-to-RP value | 0.0% |
| | Cash flow | $ 228,000 | | Loan-to-NAV | 0.0% |
| | Advanced Variables | | | | |
| | Aseet-level yield | 7.1% | | | |
| | Value growth rate | 3.1% | | | |
| | Cash flow growth rate | 3.5% | | | |

SYSTEM AND METHOD FOR AUTOMATED FRACTIONAL OR UNDIVIDED INTEREST VALUATION

CROSS-REFERENCE TO RELATED APPLICATION

This application is a U.S. National Stage of International Patent Application No. PCT/US2017/035305, filed 31 May 2017, which claims priority to U.S. Provisional Application No. 62/343,755, filed 31 May 2016, the disclosure of which is incorporated herein by reference in its entirety.

FIELD OF THE INVENTION

The present invention generally relates to valuations and more particularly to undivided or fractional interest valuation.

BACKGROUND

The ability to perform undivided/fractional interest valuation requires an understanding of both business and real estate valuation. To date, neither of these professions has developed a working body of knowledge that covers both disciplines and is a regular part of the professional appraiser's training. With few exceptions, what currently passes for valuation is an assortment of methods that are routinely unrelated to the facts of the case, and often result in unpersuasive valuations. Nonprofessionals (advisors and partners) generally receive little education regarding valuation industry best practices, and historically, attempts by marginal tax practitioners and poorly qualified appraisers to do fractional interest valuation work have led to tax compliance issues. Other entities with lack of proper understanding of valuation are family and partner buyouts, equitable division/distribution of family assets, and litigation for matrimonial, partner divorces, fraud and malpractice. A great deal of real estate has been divided into fractional interests, and the demand for reliable valuations will exist for a very long time.

SUMMARY

Embodiments of a valuation method and a valuation system for valuation of undivided or fractional interests in assets such as real estate are disclosed herein. One embodiment as a computer implemented process utilizes a comprehensive interview process that guides a user to identify material facts and adjust variables that are input into the valuation system implementing a valuation process on a distributed computing system.

In a computer implemented embodiment of a valuation system and process, calculated results for undivided or fractional interests in assets such as real estate are generated based on user input, wherein the results are updated based on user inputs and adjustments to variables used in the calculations.

One embodiment includes a graphical user interface for interacting with the user, and a valuation module that implements a valuation process for generating valuation results based on the user inputs. The graphical user interface may be implemented as a client module that communicates with the valuation module via communication link.

The client module guides the user through display screens to prepare the user for the valuation process, including checklists for documents and information needed for the valuation process. The client module then prompts the user to enter necessary information such as business information, real estate information, financial information, and other related information.

In one embodiment, the valuation system is cloud-based, wherein the valuation module is implemented on a web server, and the client module is implemented on a web browser for user interaction, wherein the valuation module and the client module communicate via the internet.

BRIEF DESCRIPTION OF DRAWINGS

The foregoing features and other features will now be described with reference to the drawings of various aspects. In the drawings, the same components have the same reference numerals. The illustrated aspects are intended to illustrate, but not to limit the present disclosure. The drawings include the following Figures.

FIG. 5 illustrates an exemplary embodiment of a section of the website home page of the valuation system.

FIG. 6 illustrates an exemplary embodiment of a section of the website home page of the valuation system.

FIG. 7 illustrates an exemplary embodiment of the Create New screen of the valuation system.

FIG. 8a illustrates an exemplary embodiment of a page from the Before You Start/Documents checklist of the valuation system.

FIG. 8b illustrates an exemplary embodiment of a page from the Before You Start/Documents checklist of the valuation system.

FIG. 23 illustrates an exemplary embodiment of the My Projects page, whereby the user can view their list of projects and download if desired of the valuation system.

FIG. 24 illustrates an exemplary embodiment of a page from the User Valuation Summary output of the valuation system.

FIG. 25 illustrates an exemplary embodiment of a page from the User Valuation Summary output of the valuation system.

FIG. 26 illustrates an exemplary embodiment of the "Deal Maker" option of the valuation system.

FIG. 27 illustrates an exemplary embodiment of the "Planner" option of the valuation system.

The accompanying drawings are included to provide a further understanding of the disclosed embodiments. In the drawings, like numerals represent like elements.

DETAILED DESCRIPTION

Figure 1:
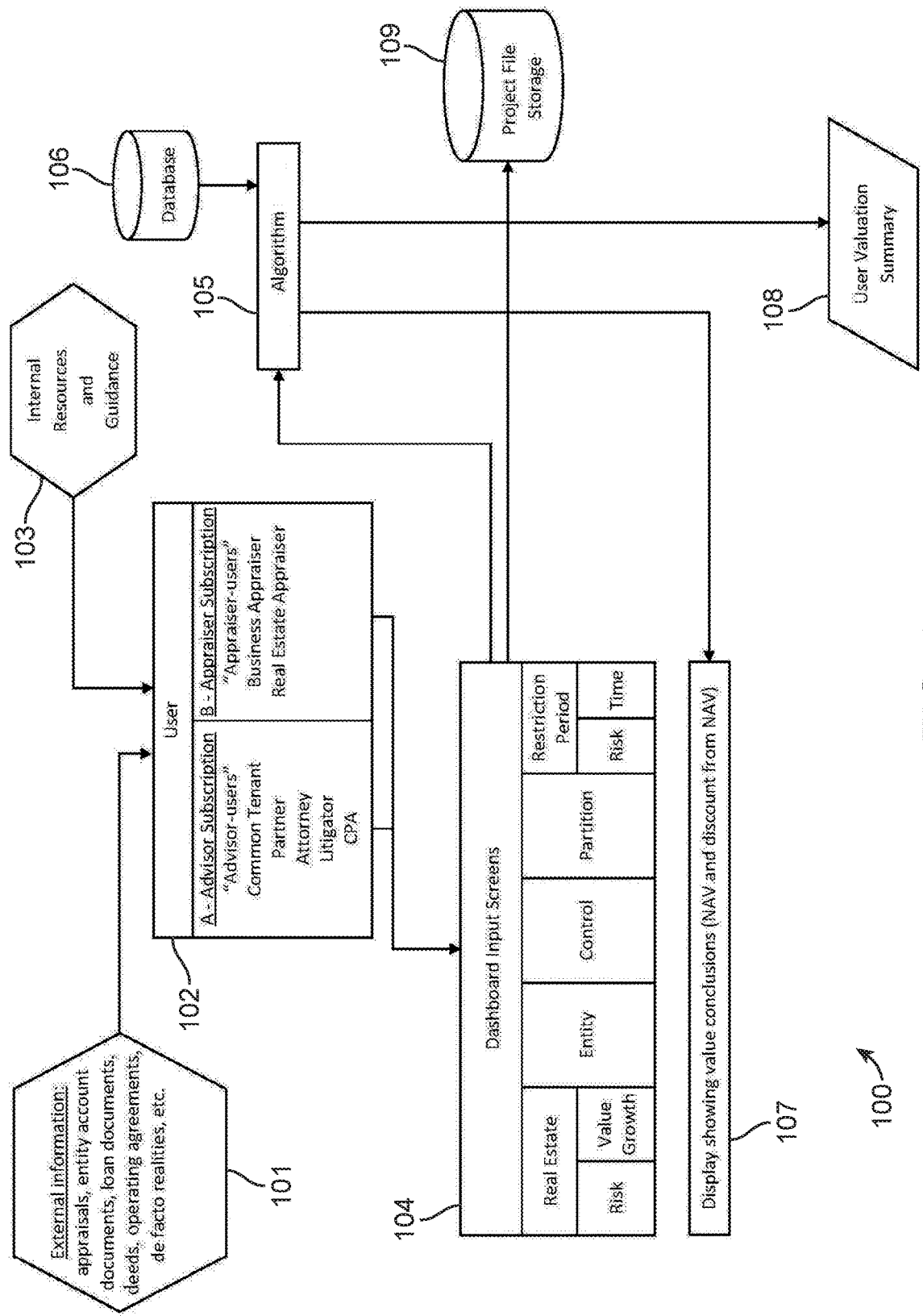
FIG. 1 illustrates an exemplary embodiment of an overview of an embodiment of a valuation method, system and engine, according to the present invention.

The following description is made for the purpose of illustrating the general principles of the embodiments disclosed herein and is not meant to limit the concepts disclosed herein. Further, particular features described herein can be used in combination with other described features in each of the various possible combinations and permutations. Unless otherwise specifically defined herein, all terms are to be given their broadest possible interpretation including meanings implied from the description as well as meanings understood by those skilled in the art and/or as defined in dictionaries, treatises, etc.

The modules and other components of the valuation system described herein below may be implemented as machine executable code or as computer implemented method. In one embodiment, the valuation process (valuation algorithm) is performed at a server such as in a cloud computing server, and results provided to a user via a client such as web browser on a personal computer or mobile computing device. One implementation comprises a computer implemented system as a website application that can be used by a user with access to a computer or like system such as mobile computing devices (e.g., tablets, smart phones).

Embodiments of a valuation method and a valuation system for valuation of undivided or fractional interests in assets such as real estate are disclosed herein. One embodiment as a computer implemented process utilizes a comprehensive interview process that guides a user to identify material facts and adjust variables that are input into the valuation system implementing a valuation process on a distributed computing system.

In a computer implemented embodiment of a valuation system and process, calculated results for undivided or fractional interests in assets such as real estate are generated based on user input, wherein the results are updated based on user inputs and adjustments to variables used in the calculations.

One embodiment includes a graphical user interface for interacting with the user, and a valuation module that implements a valuation process for generating valuation results based on the user inputs. The graphical user interface may be implemented as a client module that communicates with the valuation module via communication link.

The client module guides the user through display screens to prepare the user for the valuation process, including checklists for documents and information needed for the valuation process. The client module then prompts the user to enter necessary information such as business information, real estate information, financial information, and other related information.

In one embodiment, the valuation system is cloud-based wherein the valuation module is implemented on a web server, and the client module is implemented on a web browser for user interaction, wherein the valuation module and the client module communicate via the internet.

In one embodiment useful with real estate fractional interest valuations, the valuation system maintains a comprehensive fact list and implements an interview process that is organized around five fundamental fact classifications specific to real estate as the underlying asset: (1) real estate, (2) entity accounting, (3) control attributes of the entity structure, (4) partition lawsuit facts, and (5) restriction period and risks. The user is guided by the automated valuation system via user interface blocks (graphical user interfaces) on a display screen of a computer system. As the user identifies and considers specific facts and inputs or adjusts relevant variables, a valuation algorithm implemented in the valuation process uses valuation models and internal logic, combined with historical data, to generate a value conclusions (valuation results) for the user. As the facts are input to the valuation system by the user, the valuation process provides the effect of each set of facts on the value conclusion (e.g., displayed to the user on a display screen in real time, stored in a data base, transmitted to a desired destination via a data communication link, etc.). In addition to providing said value conclusions, the automated valuation system conveys a high level of understanding to the user, even if not a professional valuer or value appraiser.

One embodiment disclosed herein enables valuation of undivided or fractional interests in real estate, including established fields of business valuation and real estate appraisal, particularly with regard to providing an automated valuation system by which practitioners can perform valuations with speed and accuracy that has heretofore been unattainable. It should be noted that valuation of undivided or fractional interests in real estate is a narrow specialty practice. Such valuation bears almost no resemblance to a valuation for an operating business. In a similar fashion (and by way of illustration), valuing a business in liquidation (e.g., liquidation of machinery and equipment and/or inventory) bears little resemblance to a valuation for an operating business. An embodiment of the valuation method and system is disclosed herein for valuing undivided or fractional interests in real estate.

One embodiment valuation method and system disclosed herein, enables training large numbers of valuation professionals by: (a) providing a simplified and comprehensive guided valuation system that encourages thoughtful consideration and investigation of relevant material facts, and (b) providing valuation algorithms, valuation mathematical models, logical processes, and relevant historical data utilized for generating an accurate and reliable interest valuation, such as for fractional (partial) or undivided interests.

In one embodiment, the valuation system utilizes business and real estate valuation models, which enable performing undivided or fractional interest valuations based on both business valuation and real estate valuation models. An embodiment of the valuation system and method integrates both business valuation and real estate valuation models, useful in professional appraiser training.

Embodiments disclosed herein further provide solutions to tax compliance practices. Embodiments disclosed herein are further provide solutions in family and partner buyouts, equitable division and distribution of family assets, litigation for matrimonial or partner separation, fraud and malpractice, etc.

Embodiments disclosed herein further provide a comprehensive, reliable, and accessible system for valuing fractional interests in real estate.

An embodiment disclosed herein comprises a computer implemented method and system that leads the user through a comprehensive fact list and interview process, and applies valuation models using logical functions and historical databases to generate high quality appraisals. These results are reliable at even the lowest level of analysis, and grow increasingly more reliable as the level of user-entered detail becomes greater.

Figure 2:
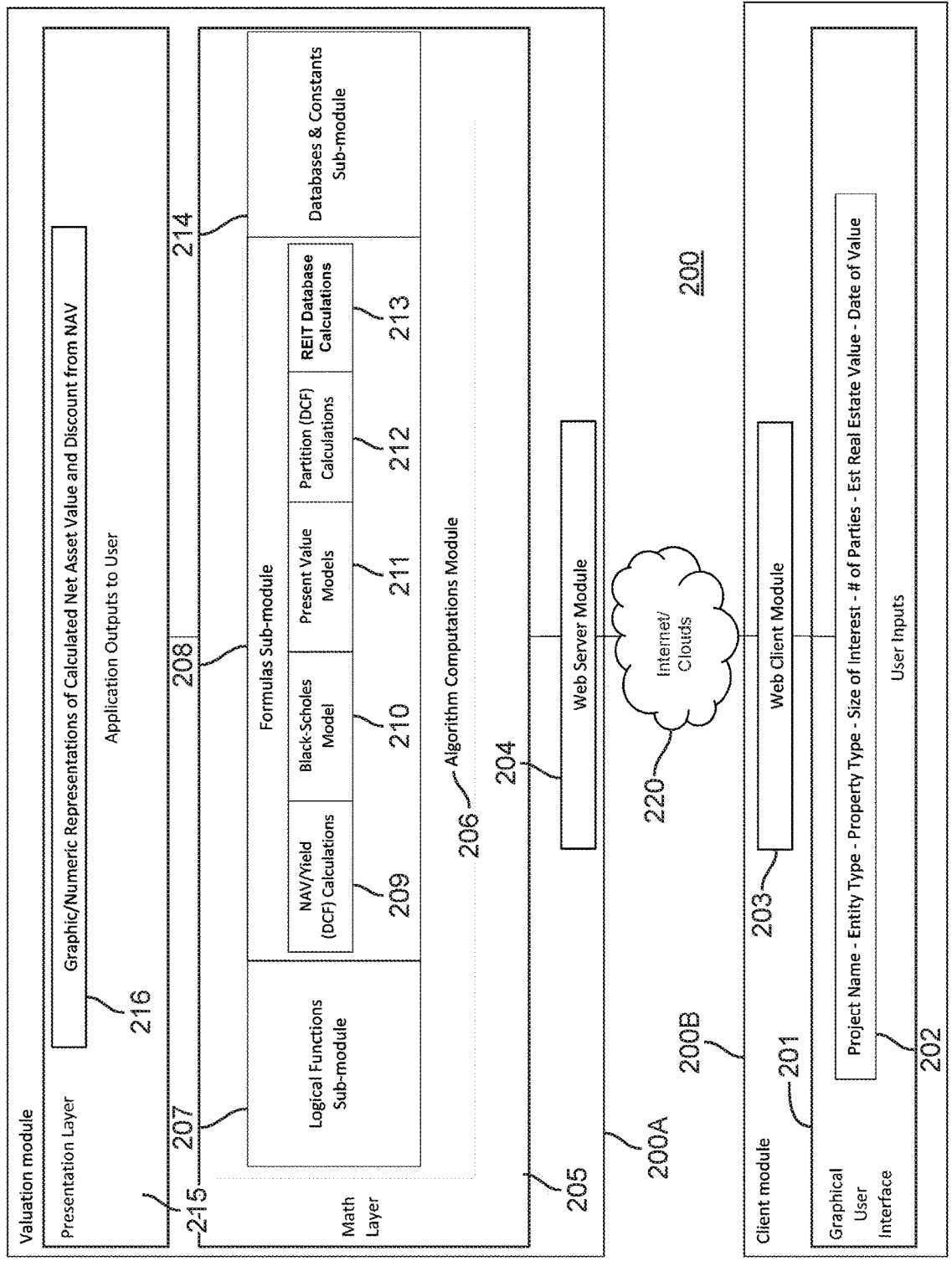
FIG. 2 illustrates an exemplary embodiment of the valuation system infrastructure.

Referring to the drawings, example embodiments and implementations of the valuation method (process) and valuation system disclosed herein are described herein below. FIG. 2 shows an example block diagram of a computer implemented automated valuation system 200 implementing a valuation method, according to an embodiment disclosed herein. In one embodiment, the valuation system 200 generally comprises a valuation module 200A and a client module 200B. The valuation module 200A and the client module 200B communicate via a communication link such as the Internet 220. In one embodiment, at least a portion of the functionality of the valuation system 200 (e.g., valuation module 200A) is cloud-based.

The client module 200B comprises a web client module 203 and a graphical user interface module (GUI) 201. The valuation module 200A comprises: a web server module 204, a math layer module 205 implementing valuation algorithm, and a presentation layer module 215. The valuation module 200A further comprises a computations module 206 that includes: a logical functions module 207, a formulas module 208, and a database module 214. The formulas module 208 includes a Black-Scholes Model module 210 (e.g., block 2811, FIG. 28), present value models module 211 (e.g., block 2810 and 2814, FIG. 28), a Partition Discounted Cash Flow (DCF) calculations module 212 (e.g., block 2802, FIG. 28), a Net Asset Value (NAV) and Yield (DCF) calculations module 209 (e.g., block 2802, FIG. 28), partitions lawsuit module (e.g., block 2812, FIG. 28), a REIT data base calculations module 213 (e.g., block 2813, FIG. 28).

The valuation module 200A further includes a presenting (presentation) module 215 for providing computation results 216 to the user via GUI 201.

Figure 28:
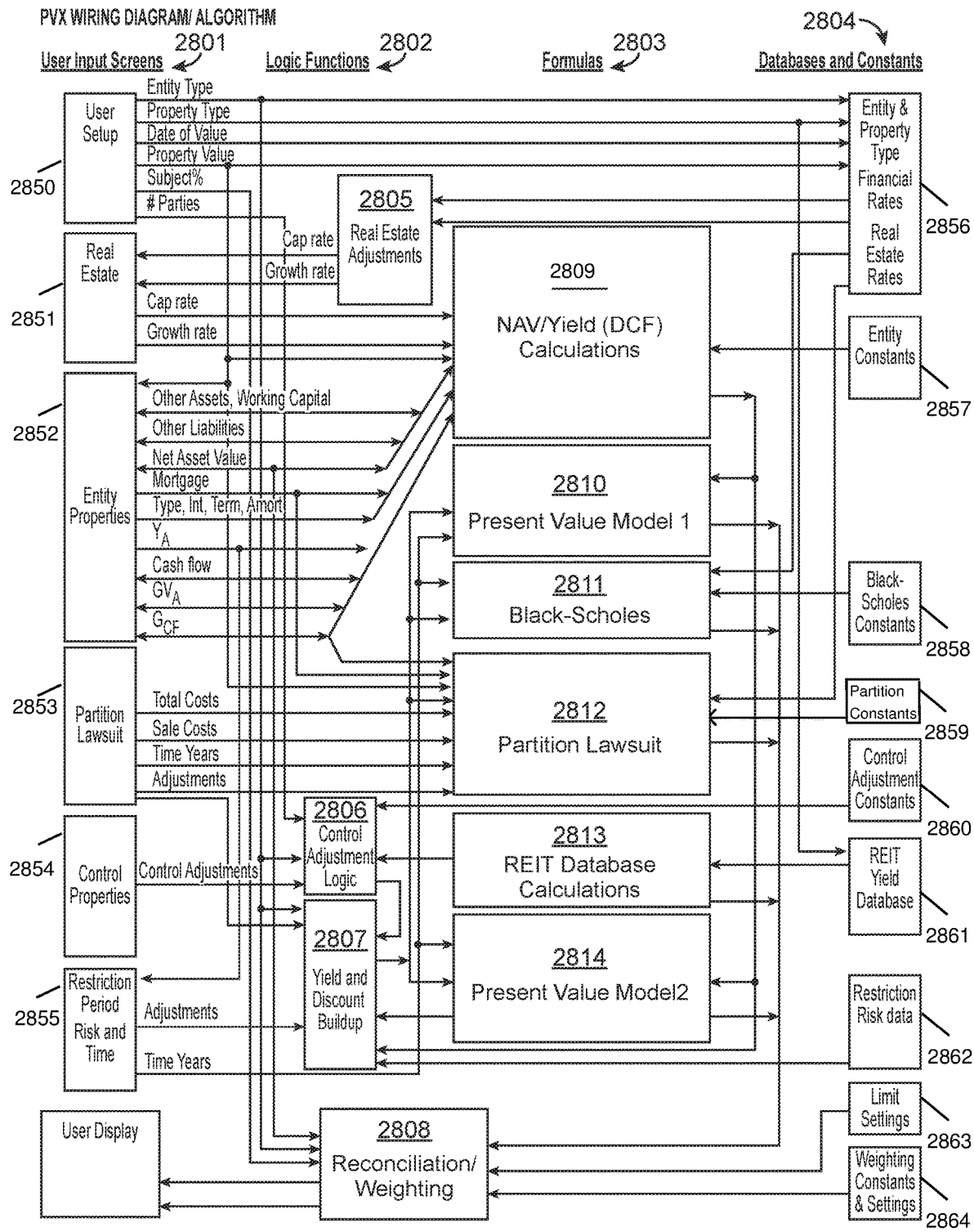
FIG. 28 illustrates an exemplary embodiment of the of the valuation system algorithm, illustrated graphically as diagram.

The valuation system 200 utilizes the web server module 204 that displays graphical user interface (GUI) 201 on a web browser of a user computer, and receives user inputs 202 from the web browser. As shown in FIG. 7, in one embodiment the user inputs comprise, for example: project name 702, entity type 703, property type 704, and size of the interest being valued 705, number of parties 706, estimated value 707, and date of value 708. FIG. 28 shows a User Setup interface block 2850 for receiving such user inputs, corresponding to FIG. 7.

The math layer module 205 receives and processes the user inputs utilizing a computations module 206 that implements a valuation algorithm, as shown in FIG. 28. The computations module 206 includes logical functions, such as user (or default) and internal adjustments, and weightings. The computations module 206 further implements formulas such as NAV/Yield (DCF) calculations, a Black-Scholes model, present value models, and Partition (DCF) calculations. The computations module 206 further includes databases module 214 (with constants and other settings). The primary databases maintain, for example: (1) real estate cap and growth rate date and (2) REIT-derived control impairment risk premium factors 213. Real estate cap and growth rate date is used only to set defaults for users who have not yet obtained a real estate appraisal or otherwise estimated these rates (system sets defaults). REIT-derived control impairment risk premium factors 213 are used to determine the yield rate premium reference for the user's control analysis. The presentation layer 215 provides the calculations results from the computations module 206 to the user browser via the web server module 204 and web client module 203. The web server module 204 and web client module 203 communicate via a communication link such as the internet 220.

FIG. 1 shows a block diagram of the overall process flow 100 of a valuation method implemented by the valuation system 200, according to one embodiment. FIG. 2 shows a block diagram of a valuation system 200 implementing the process flow 100, according to one embodiment.

In one example a user 102 of the valuation system 200 that implements the overall process flow 100 as a web application, utilizes the system 200 to perform a valuation. The user 102 may be a member of such professions which include, but are not limited to, partners, common tenants, attorneys, litigators, tax professionals (CPAs), business appraisers, real estate appraisers, etc. In one example, there are two subscription levels. An Advisor Subscription 102A leads the user (i.e., Advisor-user) to consider material facts that influence value, encouraging a more comprehensive understanding with regard to planning, deal-making and other valuation issues. An Appraiser Subscription 102B is specifically designed for a qualified business or real estate appraiser (i.e., Appraiser-user) who wishes to provide a professional opinion of value, and offers an even more detailed understanding of material facts that are used by the models and logic of the valuation algorithm. The valuation system 200 enables the Appraiser-user to prepare persuasive valuation reports for tax compliance, advising, litigation and other professional applications.

Users at either level (i.e., Advisor-user or Appraiser-user) are instructed via GUI of the valuation system 200 to gather certain external information 101 (e.g., appraisals, account documents, loan documents, deeds, operating agreements, etc.) prior to beginning a valuation project. The user may also have access to the internal resources and guidance module 103 of the valuation system, which provides the user information about how to use the system 200 and information related to valuation. In one embodiment, the module 103 includes tutorials and tooltips, documents checklists, a guide to Special Situations, online reference textbook(s), links to articles, sample reports, etc.

The user will then be guided by the valuation system 200 through a series of six Dashboard input screens 104 (GUIs) representing five fundamental fact classifications that are integral to business and real estate valuation, as implemented by the system 200. The user answers questions posed by the system 200, inputs variables, and/or adjusts sliders in the input screens 104 as directed for the particular subscription type. The effect of each input or adjustment on the concluded value is displayed in real time on an output display scale 107 in a prominent position on the Dashboard. This output display shows the concluded value of the subject fractional interest and the percentage of discount from its pro rata share of NAV ("Discount"). The display output on the GUI 201 changes for every input change initiated by the user, showing sensitivity of the result to the particular input in real time. The computations module 206 implements a valuation algorithm 105 (e.g., FIG. 28) that uses internal logic and valuation models combined with historical data 106 to interact with user-entered data to provide the concluded values shown in a display 107 on a Dashboard via GUI 201.

In one embodiment, the valuation system 200 may provide the user with the ability to create and save projects 109 and view/download User Valuation Summaries 108 showing questions asked, answers given, user settings, and results (e.g., FIGS. 24 and 25). In one embodiment, the valuation system 200 may provide Appraiser-users with internal calculations (e.g., equations, equations with variables filled in, and logical conclusions of the algorithm) for inclusion in a professional valuation report, along with further guidance on how to use this information in a professional valuation report.

Figure 3:
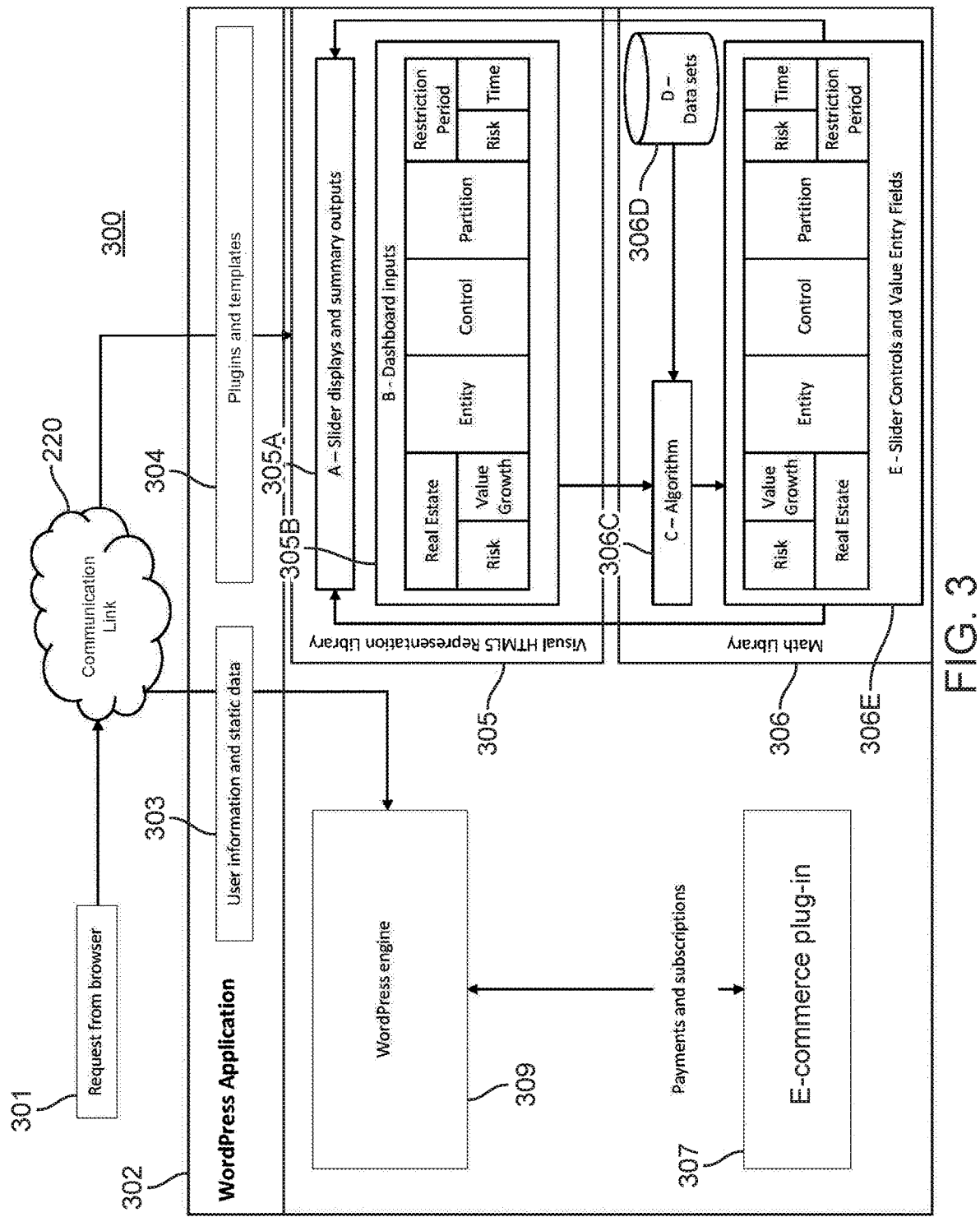
FIG. 3 illustrates in further detail an exemplary embodiment of the valuation system infrastructure.

FIG. 3 illustrates a block diagram of an example cloud-based application 300 implementation of the valuation system 200, on a distributed computing system such as a cloud computing system. The application 300 utilizes a WordPress engine 309. Referring to FIG. 3, user utilizes a web browser 301 running a personal computer to accesses a website maintained by the valuation module 200A via web server 203, through the internet. The website implements a version of the valuation module (valuation engine) 200A as a WordPress Application 302. The WordPress Application 302 comprises both user input information and static data 303, and various plug-ins and templates 304 that support said math layer 205 implemented as math layer module 306, and said presentation layer 215 implemented as the presentation layer module 305.

Figure 4:
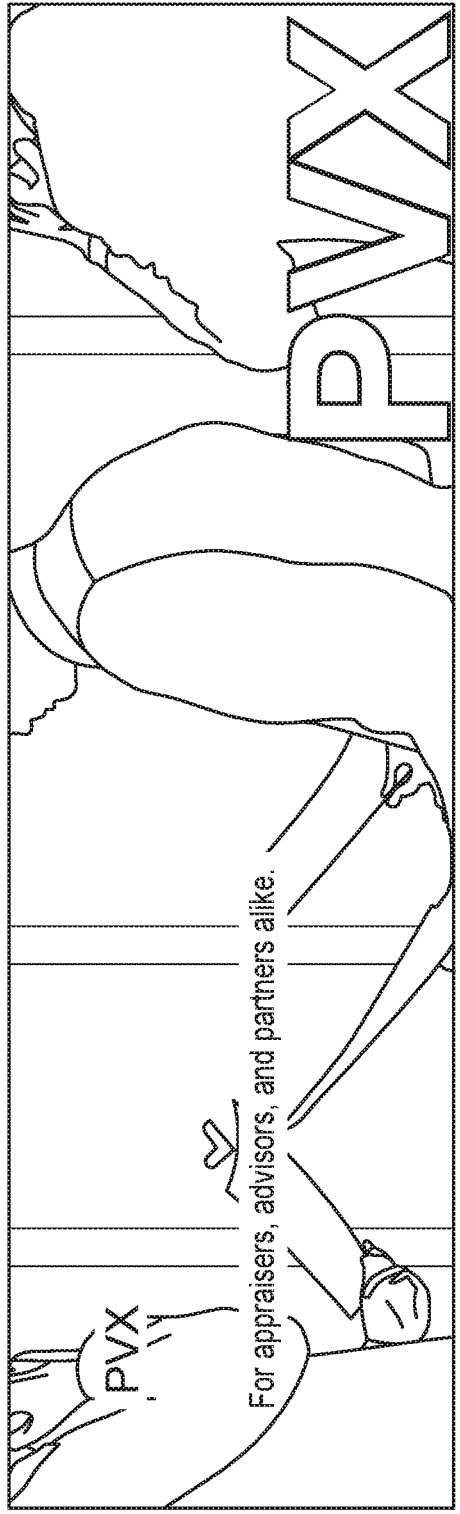
FIG. 4 illustrates an exemplary embodiment of a section of the website home page in a web implemented version of the valuation system.
Figure 5:
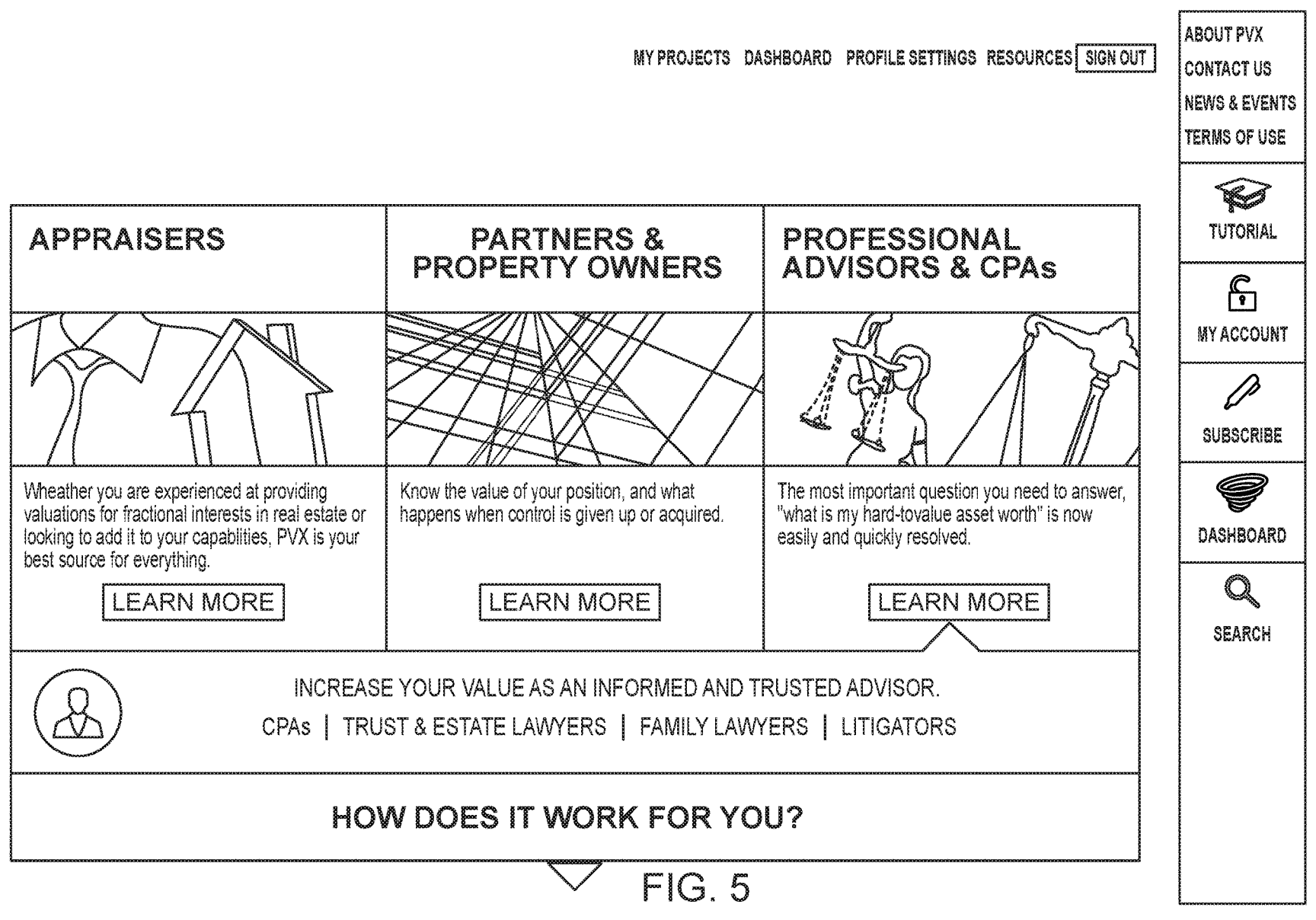

FIGS. 4-6 illustrate GUI pages of a web application embodiment of the valuation system (PVX), generated by the presentation layer 215 of the valuation module 200A, as they appear on a browser and GUI 201 in the client module 200B. Payments and subscriptions to the valuation system are powered by an e-commerce plug-in 307 such as WooCommerce open source e-commerce plug-in for WordPress. The math layer module 306 comprises a valuation algorithm 306C and data sets 306D of the valuation system, as disclosed herein.

As values are entered in the entry fields 306E on the GUI 201 via the presentation layer module 305 throughout the application, the values are graphically displayed e.g. via the Visual HTML5 Representation Library, which supports the graphic displays, including the Dashboard interface 305B and the main display slider 305A.

FIGS. 8a and 8b illustrate example web pages for a checklist a user can utilize before using the valuation system (i.e., "Before You Start/Documents Checklist"). Fractional interest valuation requires documents that identify and support the owned assets, the organization structure, operating history and forecasts, and an understanding of the parties involved, their relationship, desires and expectations regarding the assets, and anything else one would require if considering the acquisition of the interest being valued. The information identified by the checklist is required reading, and the user must confirm that they have read the document before being able to create a new project. The "Before You Start section" of the document (FIG. 8a, element 801a) outlines and describes the three levels of analysis 802a with which the user may approach the valuation process and lists a number of special situations which may require further investigation. The Documents Checklist section of the document (FIG. 8b, element 801b) is a list of documents 802b that the user may need to complete a valuation project. Each of the properties windows on the Dashboard also has a link to a list of the documents that may be needed for that particular section.

Figure 9:
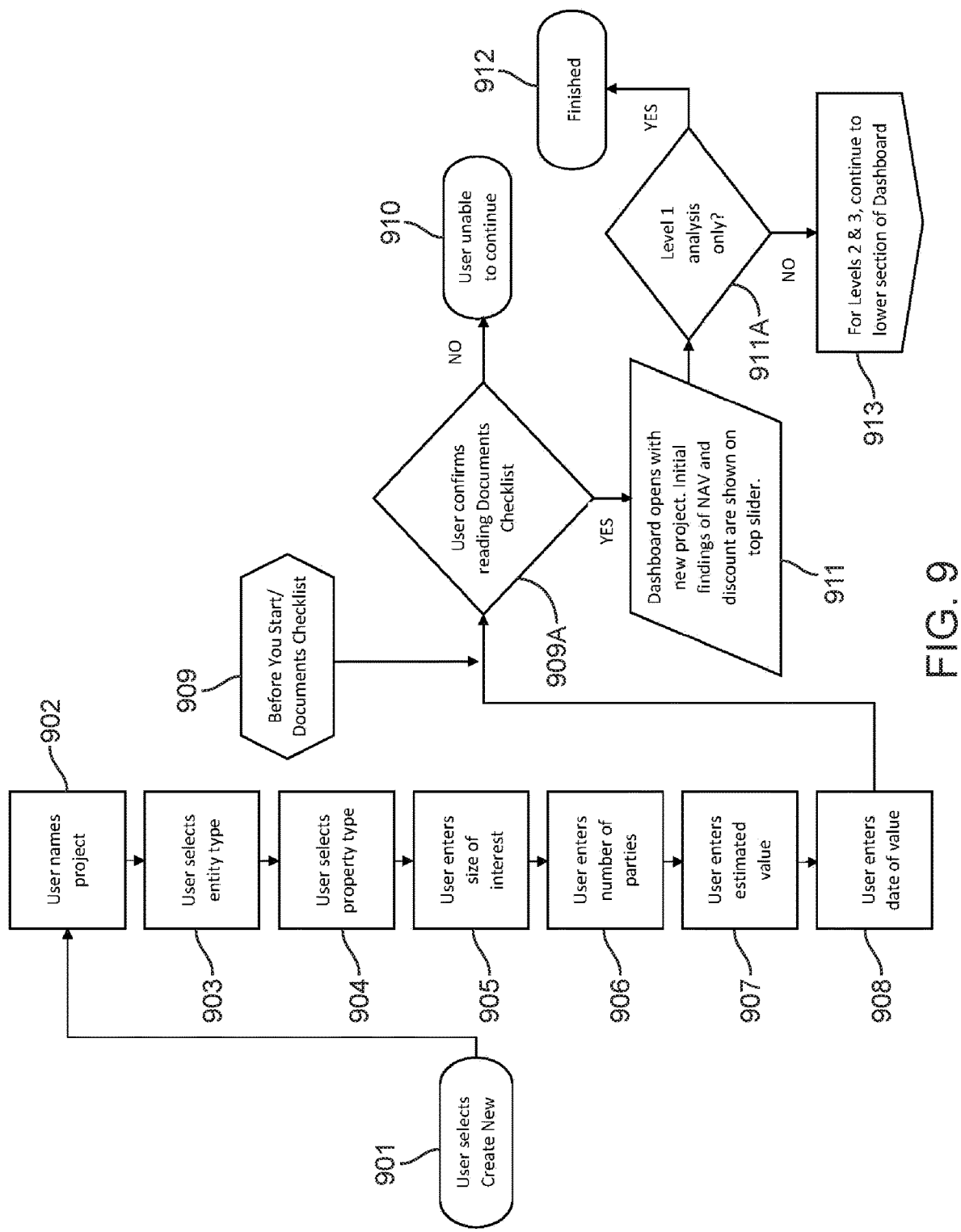
FIG. 9 describes an exemplary embodiment of the process by which the user creates a new valuation project of the valuation system.

FIG. 9 shows an exemplary process by which the valuation system disclosed herein enables the user to create a new valuation project via the user browser and GUI 201 at the client module 200B. Initially, at step 901 the user selects the Create New button 701 at the upper right of the Dashboard displayed on the GUI 201 of the user browser (FIG. 7). Referring to FIGS. 7 and 9, at step 902, the user assigns a unique name to the project 702. At step 903 the user selects the Entity type from a drop-down list provided 703. At step 904 the user then selects the property type which best describes the property from the drop-down list provided 704. This selection determines the default cap and growth rates for the valuation, based on analysis of national data. At step 905 the user enters the size (e.g., percentage equity share) of the interest 705 and at step 906 the user enters the number of parties involved 706.

At step 907, the user enters an estimated value for the real estate 707. This must be the opinion of a qualified real estate appraiser if the user intends to provide a professional opinion of value. At step 908, the user enters a date of value 708, which may only be a past or present date, not a future one. At step 909, a link is provided to a document that informs the user about the different levels of analysis and instructs the user which documents and information are necessary to answer the upcoming questions guiding the valuation process. At step 909A the user must confirm reading the checklist (i.e., "Before You Start/Documents Checklist") 709. At step 910, if the user has not confirmed that they have read the Before You Start/Documents Checklist, then the user will not be allowed by the valuation system to create new project by clicking the Create button 710.

Figure 10:
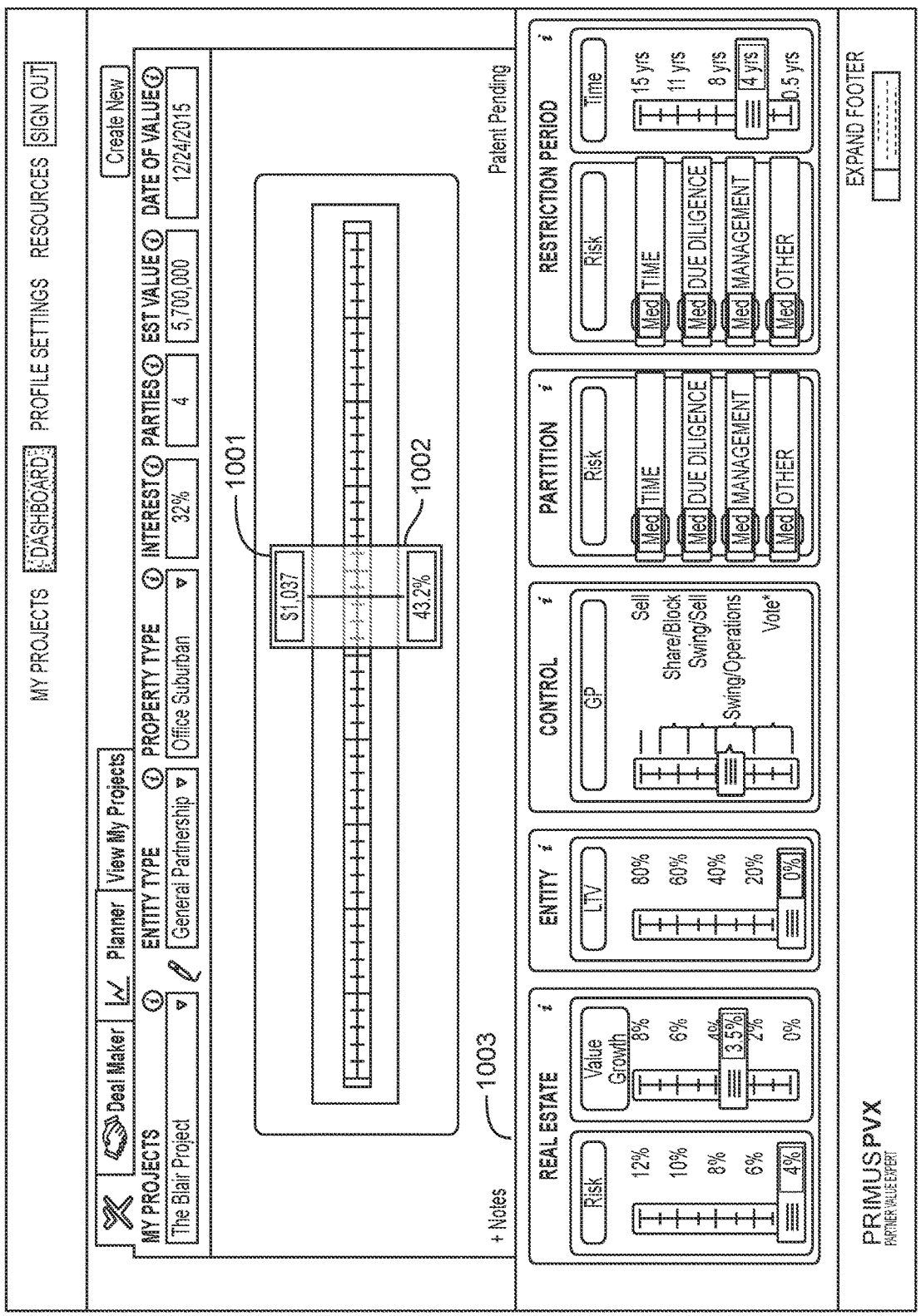
FIG. 10 illustrates an exemplary embodiment of the user's Dashboard of the valuation system.

At step 911, if the user confirms they have read the checklist, the user may select Create and the Dashboard 1000 opens with the newly-created project (FIG. 10) showing the initial conclusions (results) of subject interest value

Figure 11:
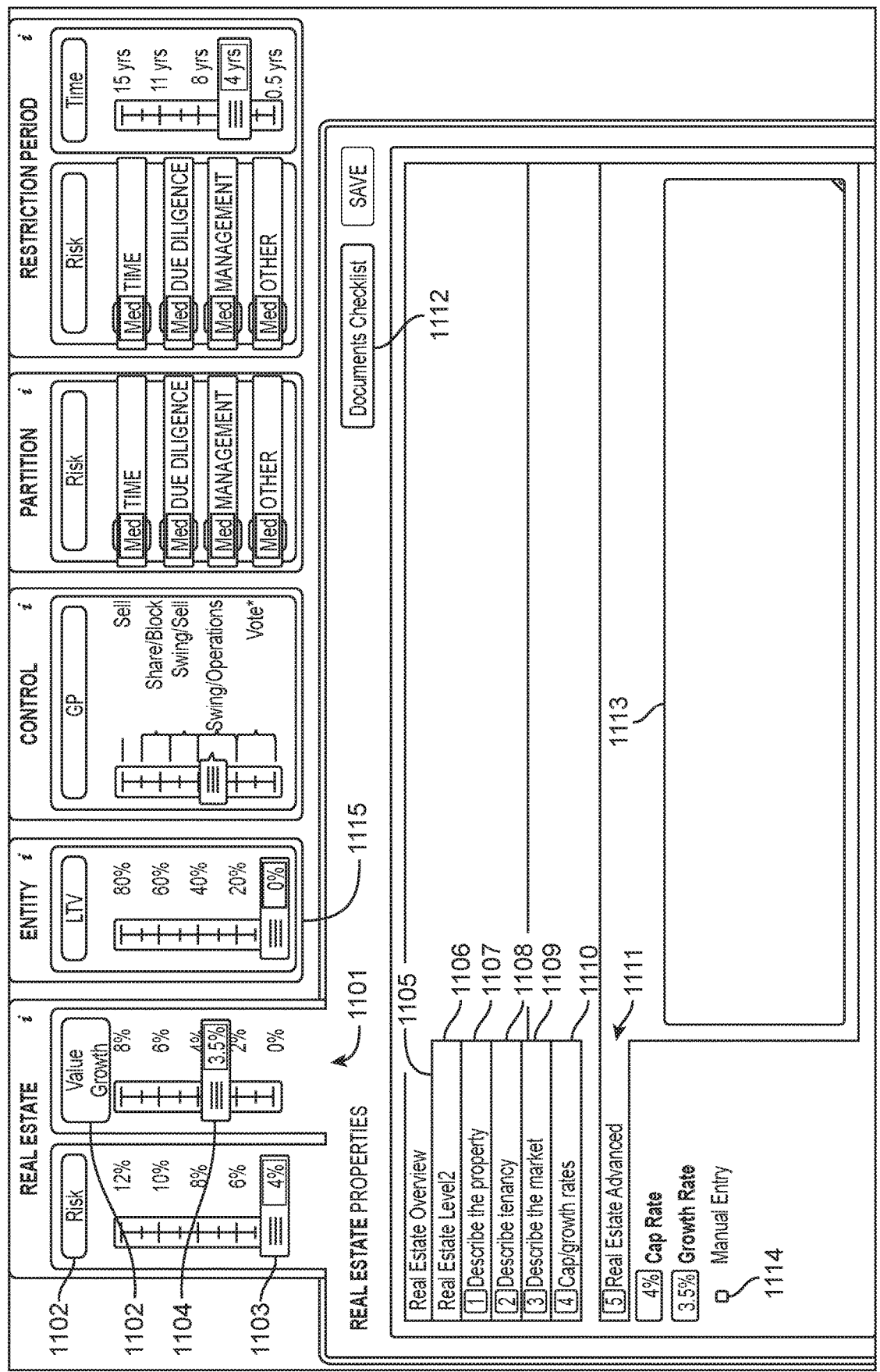
FIG. 11 illustrates an exemplary embodiment of the Real Estate Properties window of the Dashboard of the valuation system.

1001 and Discount 1002 on the display. This conclusion is based on system defaults and is an approximation only (e.g., a starting point). At step 911A it is determined what type of analysis/valuation the user wants to perform. At step 912, if user is only doing a Level 1 analysis, the valuation process is finished. At step 913, a user who intends to do a Level 2 or 3 analyses, may continue to the Real Estate Properties window 1003 in the lower section of the Dashboard (FIG. 11). The sequence of steps described herein is recommended but not required. The user may access any of the valuation process inputs in any sequence they wish. FIG. 28 shows a Real Estate interface block 2851 corresponding to FIG. 11.

Figure 12:
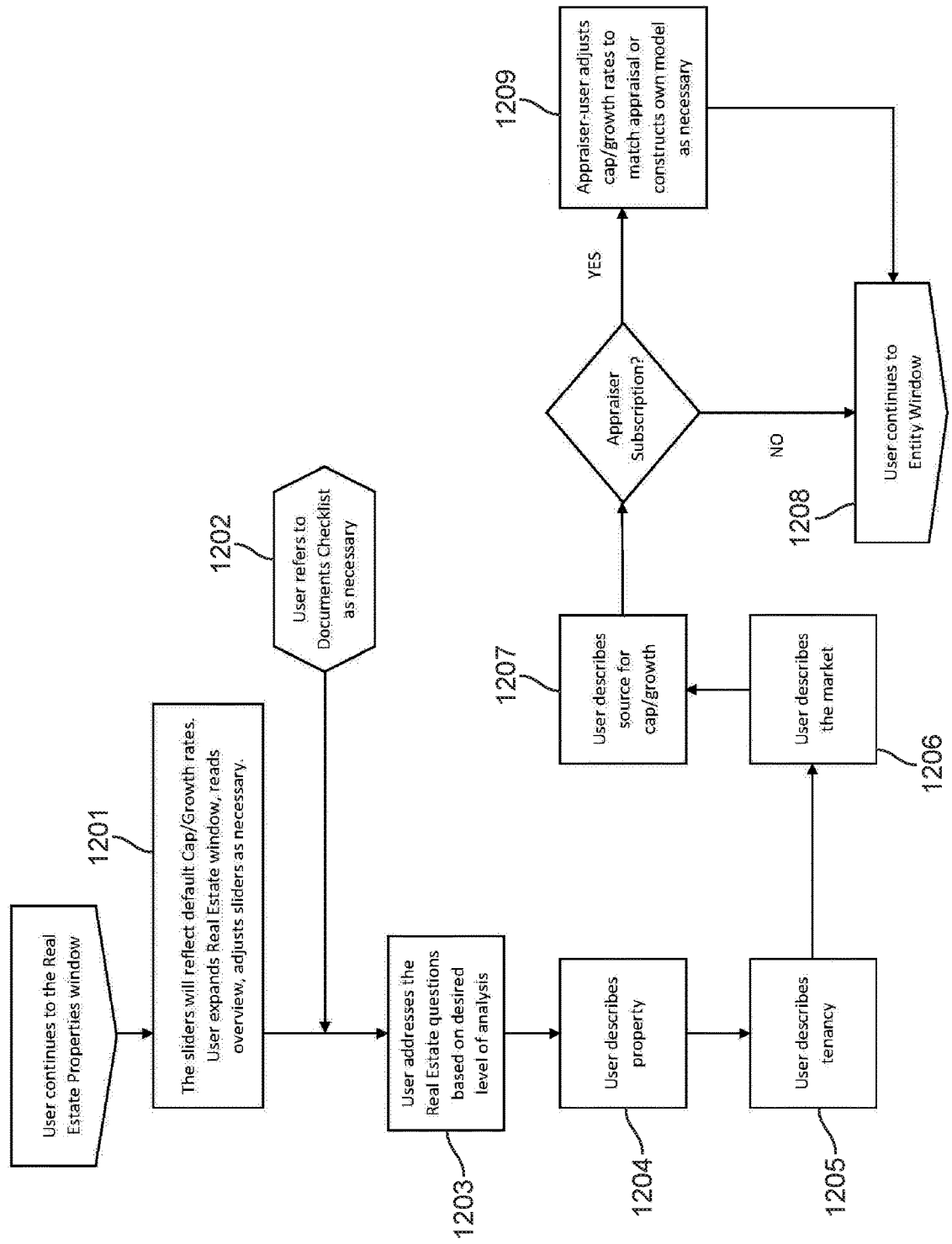
FIG. 12 describes an exemplary embodiment of the process by which user progresses through the Real Estate Properties window of the Dashboard of the valuation system.

FIG. 12 depicts an exemplary process by which user may answer questions in the Real Estate Properties Window (FIG. 11). Referring to FIGS. 11 and 12, the user starts with the Real Estate Properties window 1100. At step 1201, sliders reflect system defaults of Cap rate 1103 and Growth rate 1104 at first, and the user expands Real Estate Properties Window by selecting either Risk or Value Growth buttons 1102 on Real Estate tab 1101 in lower section of Dashboard. The user reads Overview 1105 and adjusts sliders 1103, 1104 as necessary. At step 1201 the user may refer to Documents Checklist 1202 provided for this specific section as necessary to make sure required documents and information are at hand. At step 1203 the user addresses questions in this section at GUI elements 1107-1111 according to desired level of analysis. Additional guidance is provided for Level 2 users 1106.

Figure 13:
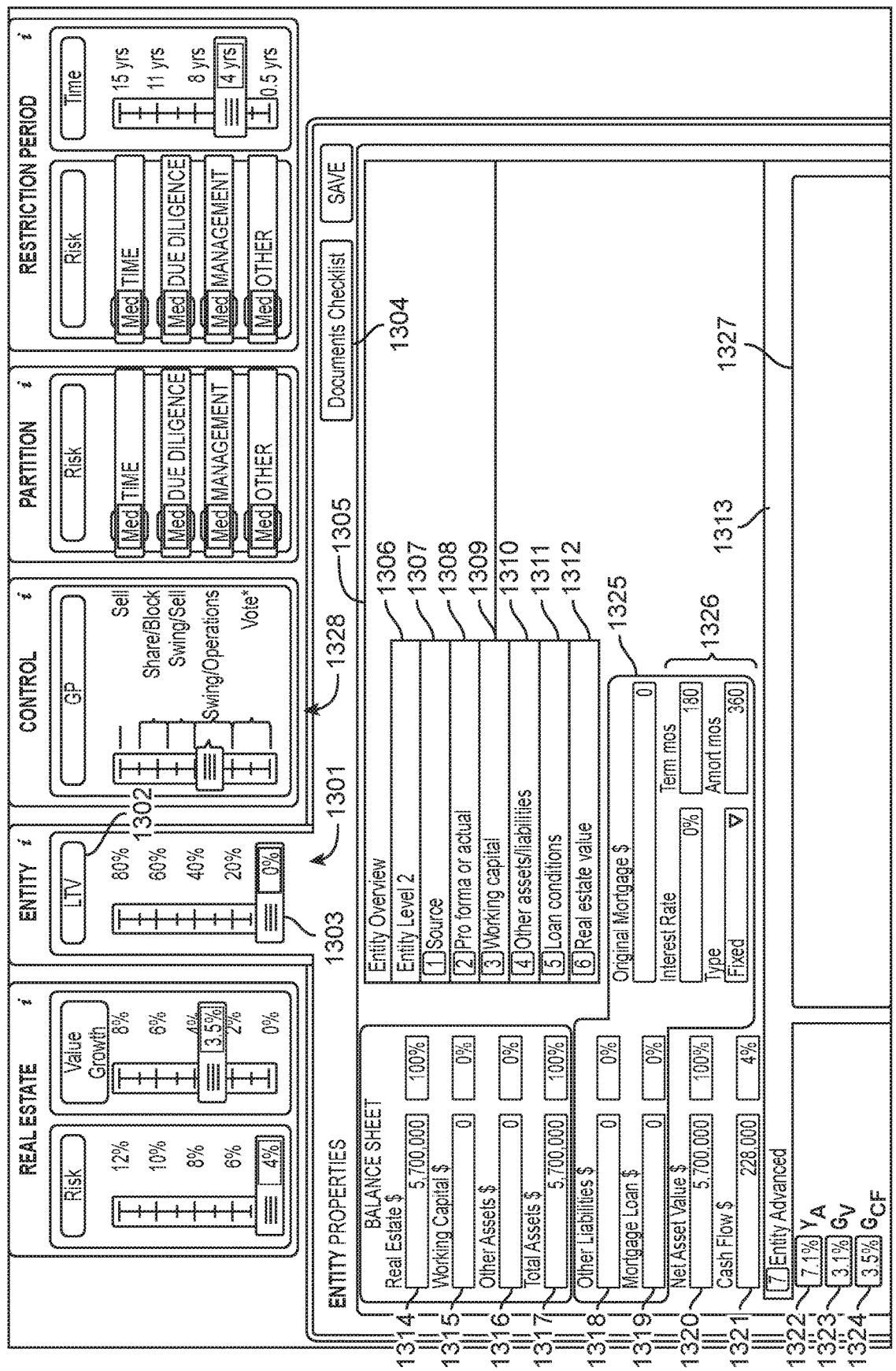
FIG. 13 illustrates an exemplary embodiment of the Entity Properties window of the Dashboard of the valuation system.

Clicking on each question reveals further guidance as to what questions user should ask, and space is provided 1113 for user to make and save notes. At step 1204, the user describes type and condition of property being valued 1107. At step 1205, the user describes the tenancy (number of tenants, lease term, rent, etc.) 1108. At step 1206, the user describes local market and any property-related influences 1109. At step 1207, the user names source for cap/growth rates (real estate appraiser or actual appraisal, broker, etc.) 1110. At step 1208, if the user is a non-Appraiser-user, the process continues to Entity Properties window 1115 (FIG. 11). At step 1209, if the user is an Appraiser-user the process will have a "Real Estate Advanced" section 1111 available, where user adjusts cap/growth rates to match appraisal (or, if either of the cap/growth rates lie outside suggested range user may select Manual Entry 1114 and construct offline DCF model) before continuing to Entity Properties window 1115 at step 1208 (FIG. 13). FIG. 28 shows an Entity Properties interface block 2852 and a Entity Properties interface block, corresponding to FIG. 13.

Figure 14:
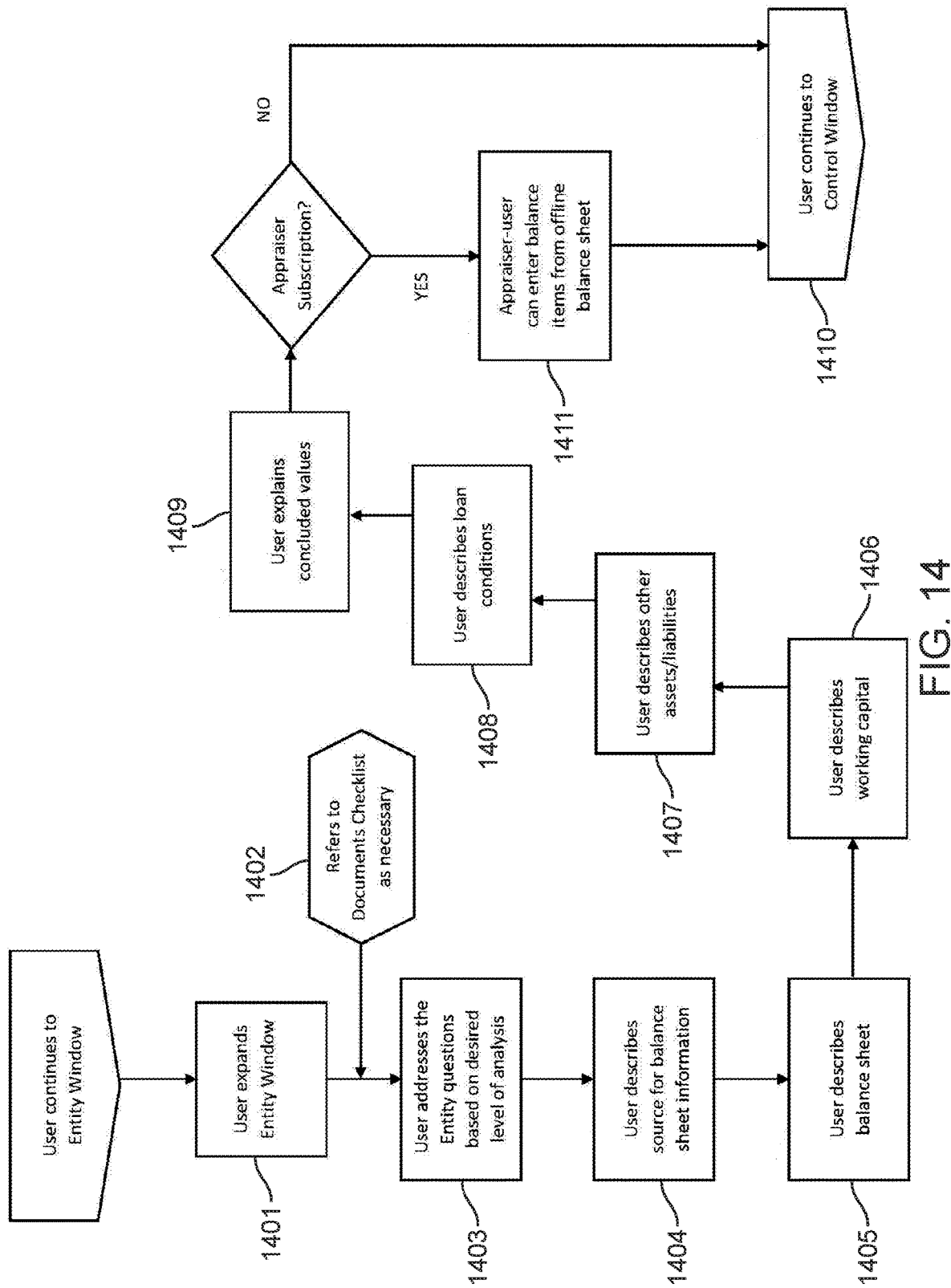
FIG. 14 describes an exemplary embodiment of the process by which user progresses through the Entity Properties window of the Dashboard of the valuation system.

FIG. 14 depicts an exemplary process by which user may answer questions and enter data in the Entity Properties Window (FIG. 13). The user moves to Entity Properties window 1300. The slider 1303, which reflects system defaults at first, adjusts the loan-to-value ratio (the current loan amount divided by the real estate value). At step 1401, the user expands Entity Properties Window by selecting LTV button 1302 on Entity tab 1301 in lower section of Dashboard (FIG. 13). This window shows the entity's simplified balance sheet. It will show the real estate value already entered 1314, and other items will be shown as defaults at first. These can be changed to actual or planned values. At step 1402, the user may refer to Documents Checklist 1304 provided for this specific section as necessary to make sure required documents and information are at hand.

Figure 15:
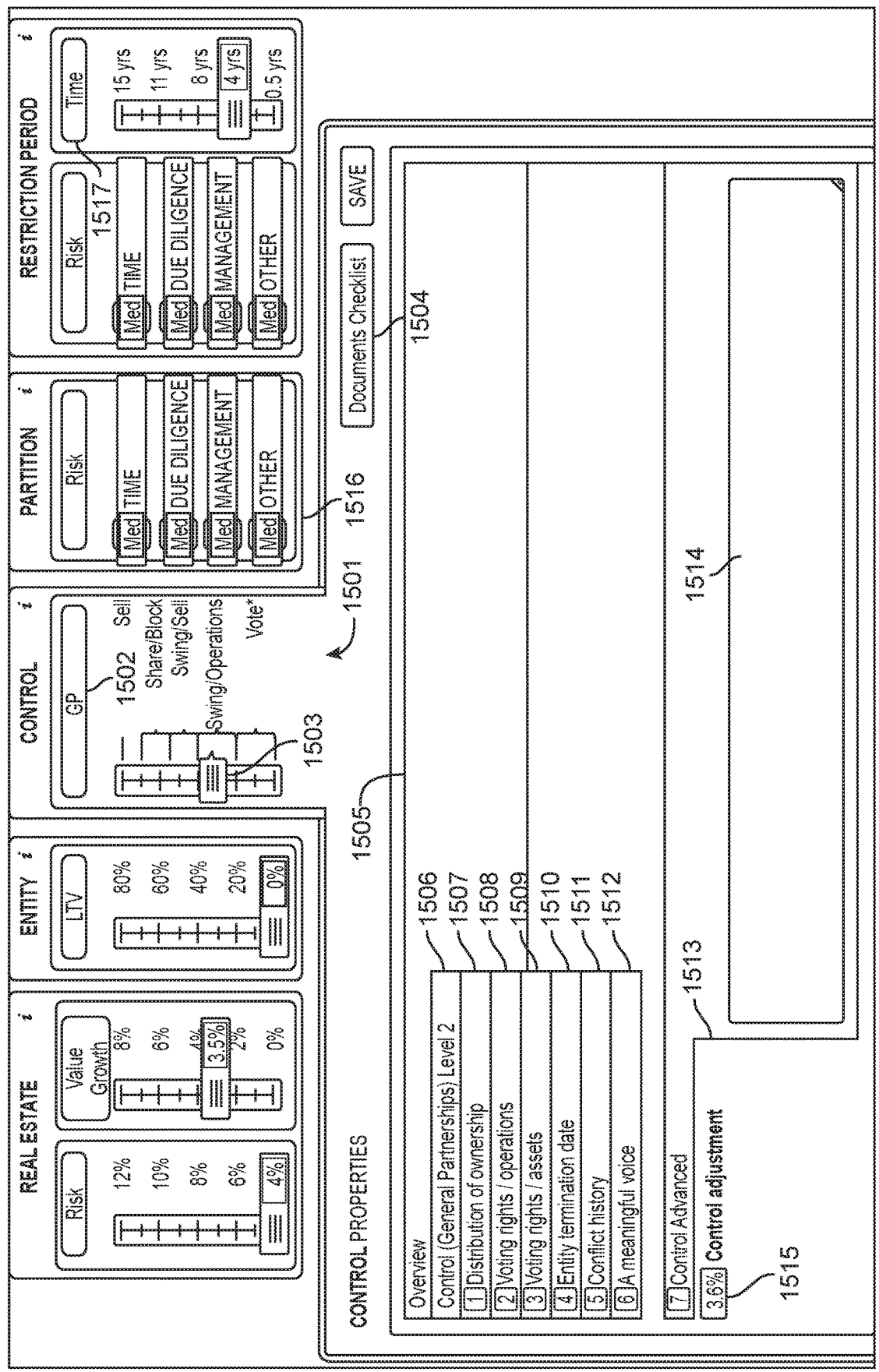
FIG. 15 illustrates an exemplary embodiment of the Control Properties window of the Dashboard of the valuation system.

At step 1403, the user then addresses questions in this section GUI elements 1307-1313 according to desired level of analysis. Additional guidance is provided for Level 2 users 1306. Clicking on each question reveals further guidance as to what questions user should ask, and space is provided for user to make and save notes 1327. At step 1404 the user describes source of information for balance sheet and enters any loan amount in field provided 1308, 1319. At step 1405, the user then describes balance sheet, date, loan information, etc. 1309. At step 1406, the user discusses, calculates, and inputs working capital in field provided 1310, 1315. At step 1407, the user describes and inputs any other assets/liabilities in fields provided 1311, 1316, 1318. At step 1408, the user describes loan conditions 1312. At step 1409, the user explains process of determining concluded values, especially noting and supporting any changes 1313. At step 1410, the non-Appraiser-user continues to Control Properties window 1328 (FIG. 15). At step 1411, an Appraiser-user will have an "Entity Advanced" section 1313 available, that shows them selected variables concluded based on the internal NAV/Yield DCF calculations for use in offline models they may wish to construct. At step 1410, the user then continues to the Control Properties window (FIG. 15). FIG. 28 shows a Control Properties interface block 2854 corresponding to FIG. 15.

Figure 16:
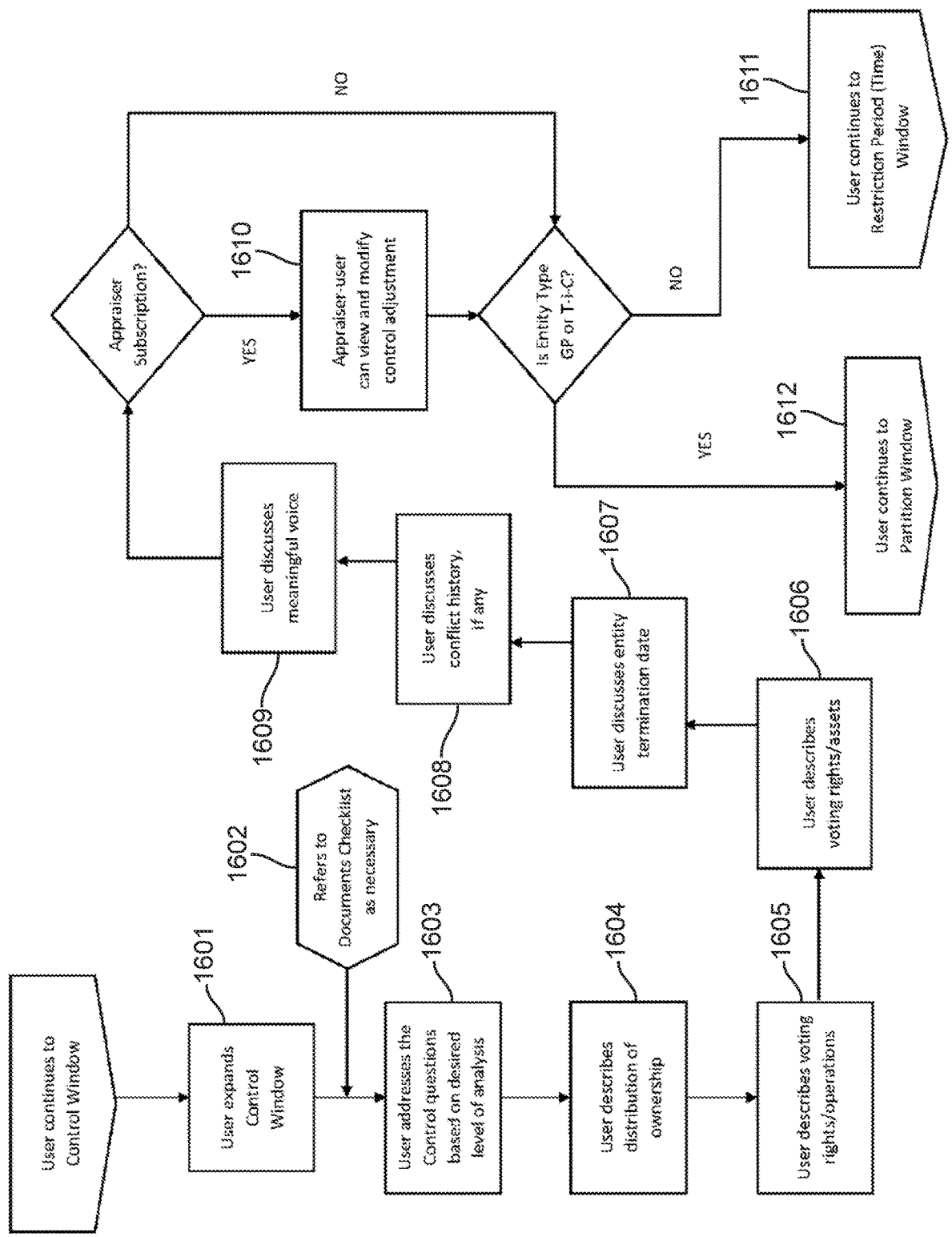
FIG. 16 describes an exemplary embodiment of the process by which user progresses through the Control Properties window of the Dashboard of the valuation system.

FIG. 16 depicts an exemplary process by which user may answer questions in Control Properties Window (FIG. 15). Referring to FIGS. 15 and 16, the user moves to Control Properties window 1500. The slider 1503 will reflect system defaults at first, but the user can adjust the slider for this section upward or downward as recommended by each question, arriving at a final determination of the interest-holder's degree of influence or control once all questions have been addressed. At step 1601, the user expands the Control Properties Window by selecting blue button (which will be labeled by the system according to Entity type) 1502 on Control tab 1501 in lower section of Dashboard. At step 1602, the user may refer to Documents Checklist 1504 provided for this specific section as necessary to make sure required documents and information are at hand. At step 1603, the user addresses questions in this section GUI elements 1507-1513 according to desired level of analysis. Additional guidance is provided for Level 2 users by the system 1504. Clicking on each question reveals further guidance as to what questions user should ask, and space is provided for user to make and save notes 1514.

Figure 17:
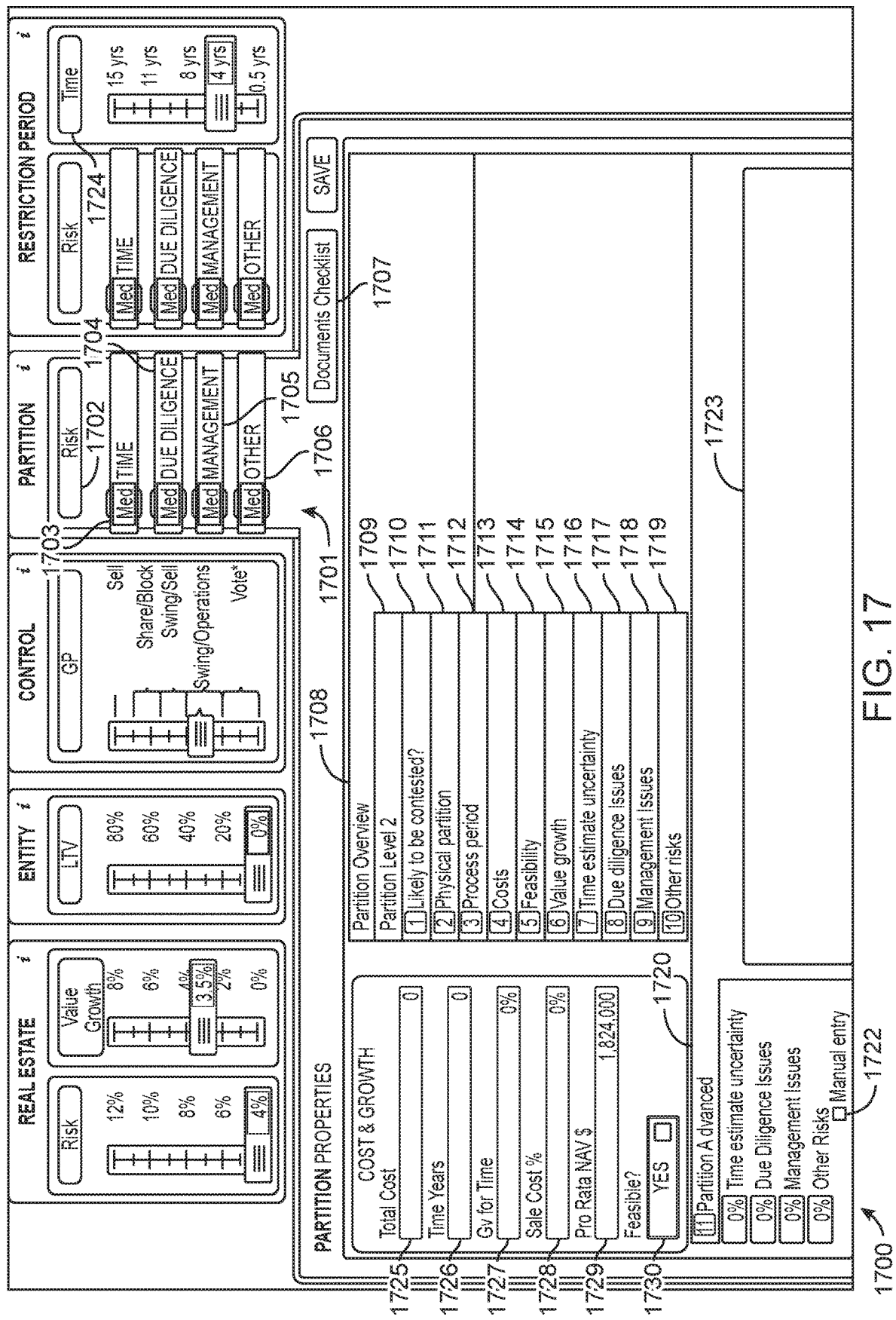
FIG. 17 illustrates an exemplary embodiment of the Partition Properties window of the Dashboard. of the valuation system
Figure 17A:
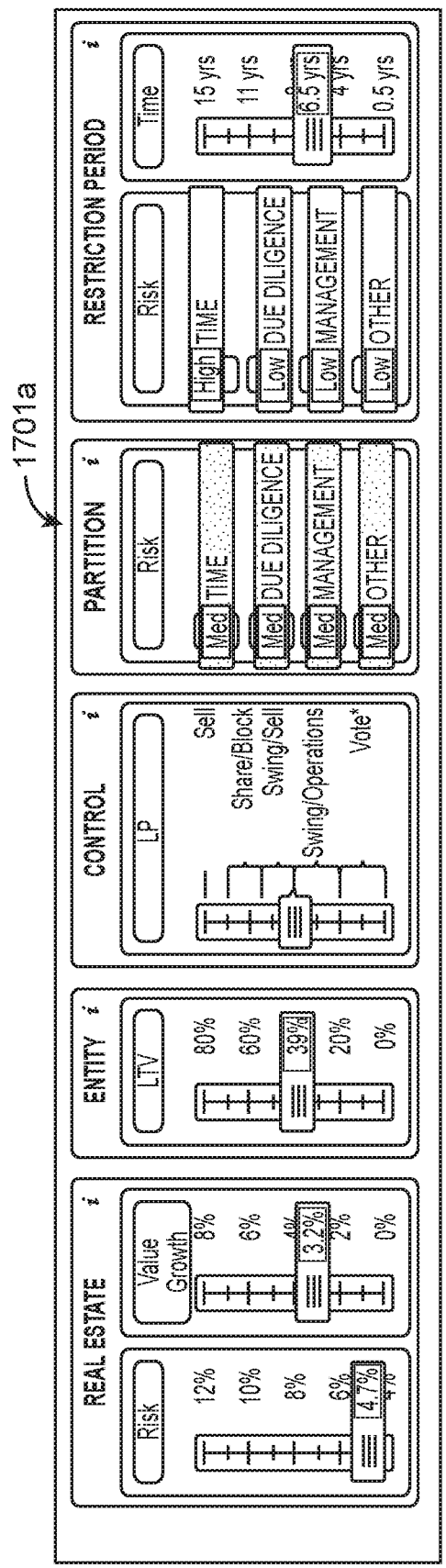
FIG. 17a illustrates an exemplary embodiment of the Partition Properties window of the Dashboard in grayed out state of the valuation system.

At step 1604, the user describes distribution of ownership 1507. At step 1605, the user discusses (i.e., inputs) voting rights and operations 1508. At step 1606, the user describes voting rights regarding asset sales and termination 1509. At step 1607, the user considers the entity's termination date and any effects that might have 1510. At step 1608, the user discusses conflict history, if any 1511. At step 1609, the user considers all of the foregoing facts and makes judgment on whether subject interest has a meaningful voice 1512. At step 1610, an Appraiser-user will have an "Entity Advanced" section 1513 that shows a numerical representation of value 1515 for the control adjustment shown on slider 1503, which can be further refined or made outside the range of the slider if desired. At step 1612, if Entity type is General Partnership or Tenancy-in-Common, a user with either subscription type (Appraiser-user or otherwise) will continue to Partition window (FIG. 17). At step 1611, if the user is not Appraiser-user and if Entity type is not General Partnership or Tenancy-in-Common, the Partition Window 1516 will be grayed out (FIG. 17a, element 1701a), as partition is not possible in these cases, and the user can skip the Partition Window and continue to the Restriction Period (Time) Window 1517 (FIG. 19).

Figure 18:
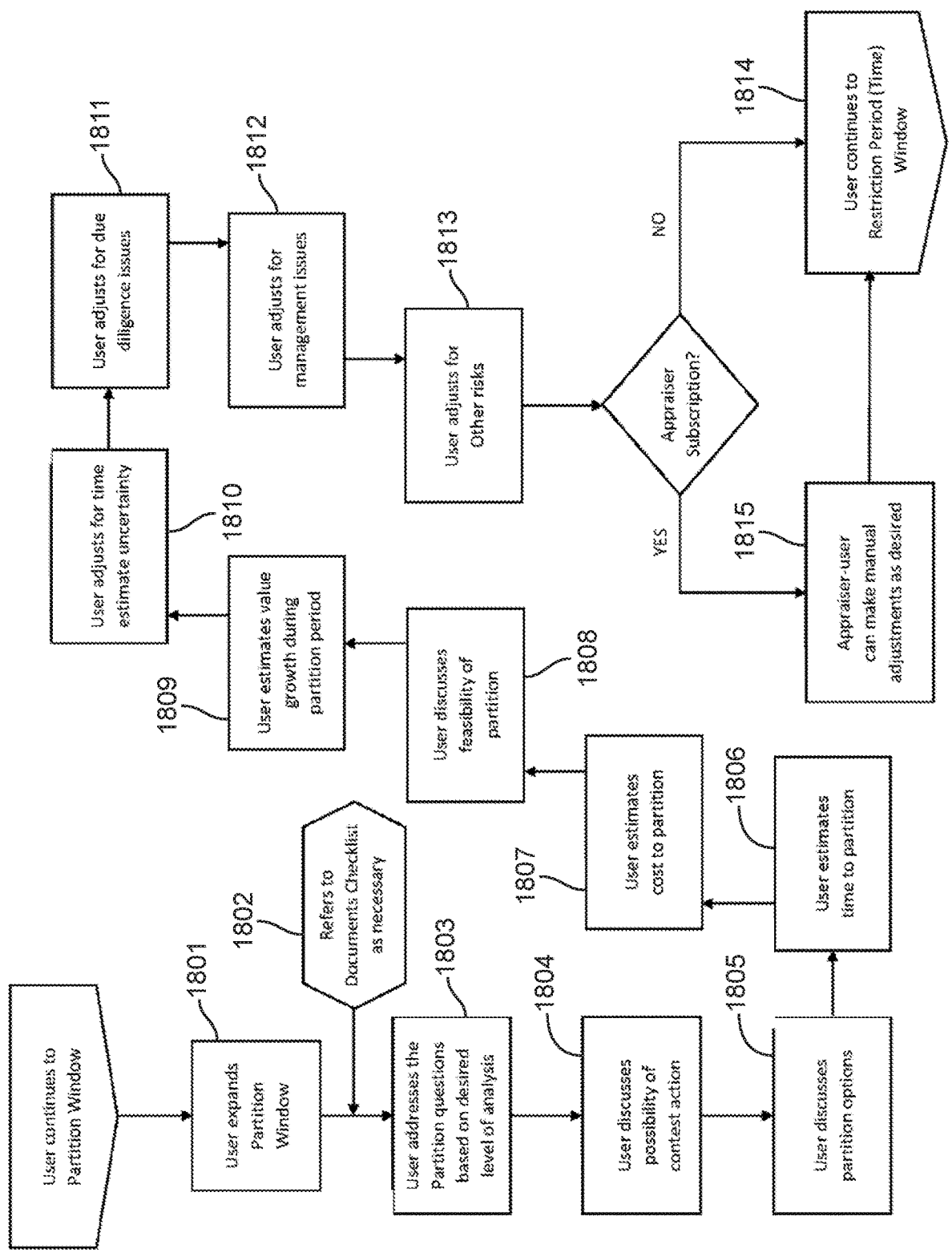
FIG. 18 illustrates an exemplary embodiment of the process by which user progresses through the Partition Properties window of the Dashboard of the valuation system.

FIG. 18 depicts an exemplary process by which user may answer questions in Partition Properties Window (FIG. 17). Referring to FIGS. 17 and 18, the user moves to Partition Properties window 1700, if it is not grayed out. Sliders GUI elements will be initially set at the valuation system defaults. The user can adjust the sliders for this section to Low, Med, or High while progressing through the questions in this section. At step 1801, the user expands Partition Properties Window by selecting Risk button 1702 on Partition tab 1701 in lower section of Dashboard. At step 1802, the user may refer to Documents Checklist 1707 provided for this specific section as necessary to make sure required documents and information are at hand. At step 1803, the user addresses questions in this section GUI elements by inputting information according to desired level of analysis. Additional guidance is provided for Level 2 users. Clicking on each question reveals further guidance as to what questions user should ask, and space is provided for user to make and save notes. At step 1804, the user discusses (i.e., inputs) possibility of contest action. At step 1805, the user discusses possibility of partition and estimates costs 1728. If it is likely, further consultation with a real estate appraiser or other experts will be necessary. At step 1806, the user estimates time (in years) needed to negotiate and accomplish partition, and enters value in field provided 1726.

At step 1807, the user estimates out-of-pocket costs for partition lawsuit, and enters in field provided 1725 (FIG. 28 shows a Partition Lawsuit (Partition Properties) interface block 2853 for litigation/lawsuit information). At step 1808, the user considers feasibility of partition, given the facts assembled so far. If deemed Not Feasible, the partition window can be switched off manually 1730. At step 1809, the user estimates value growth during partition period and enters it in field provided 1727. At step 1810, the user estimates reliability of time estimate and adjusts corresponding slider accordingly. At step 1811, the user estimates due diligence risk and adjusts corresponding slider accordingly. At step 1812, the user estimates management risk and adjusts corresponding slider accordingly. At step 1813, the user estimates any other risks and adjusts corresponding slider accordingly. At step 1814, a non-Appraiser-user continues to Restriction Period (Time) window (FIG. 19). At step 1815, an Appraiser-user will have a "Partition Advanced" section available that shows numerical representations of values for the control adjustments shown on sliders that can be further refined or made outside the range of the sliders if desired by selecting Manual Entry. This user then continues to the Restriction Period (Time) window at step 1814 (FIG. 19).

Figure 19:
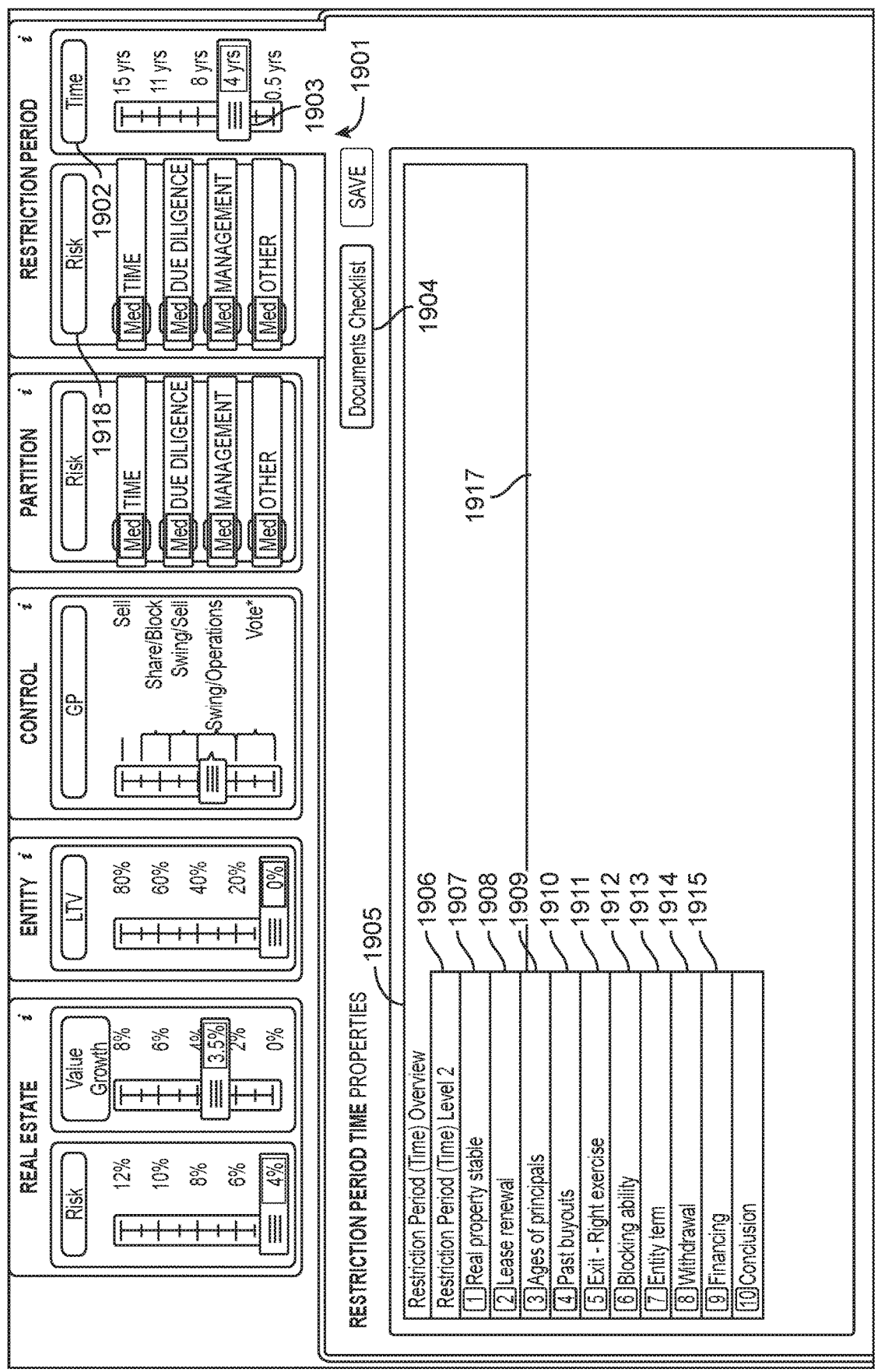
FIG. 19 illustrates an exemplary embodiment of the Restriction Period (Time) Properties window of the Dashboard of the valuation system.
Figure 20:
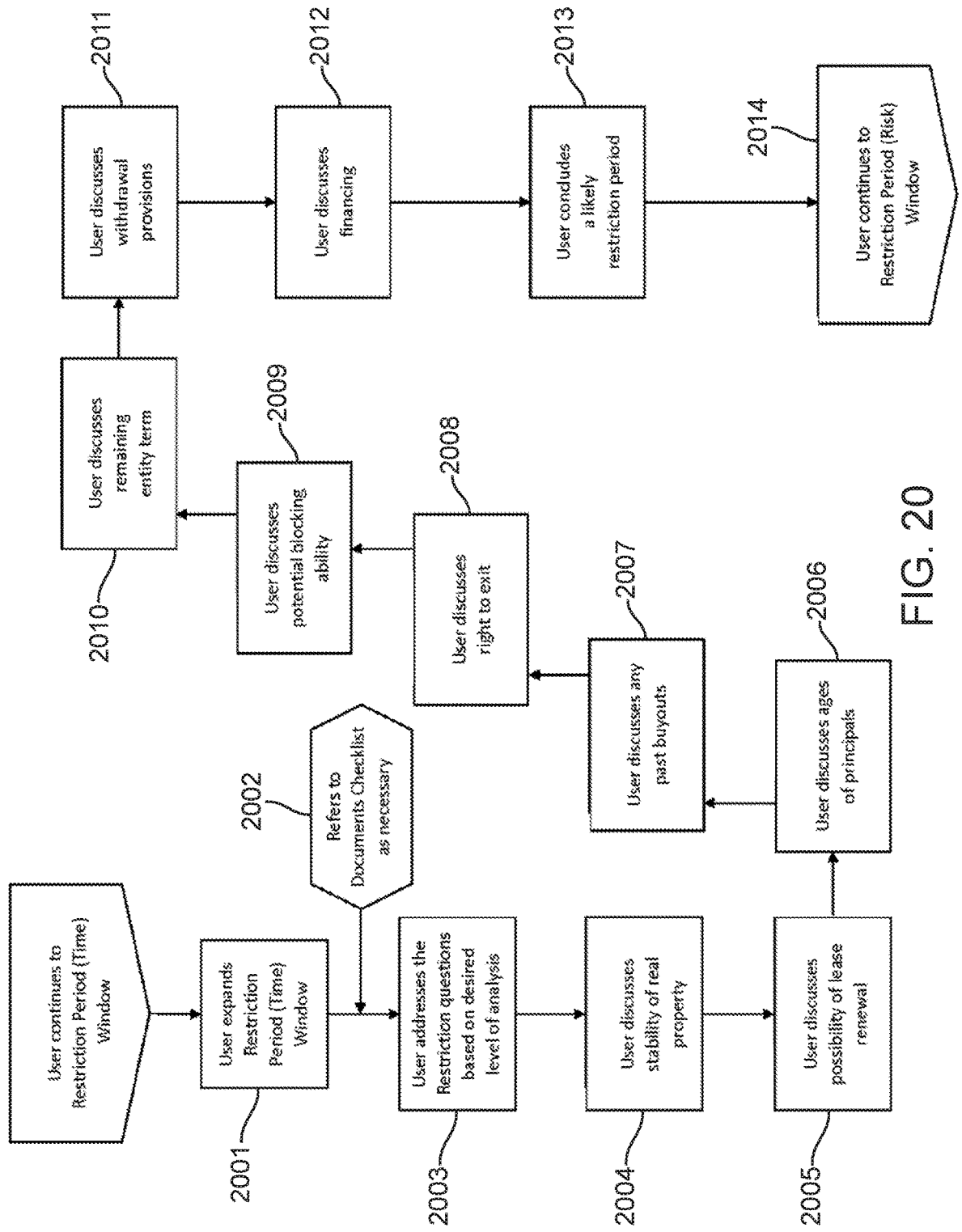
FIG. 20 illustrates an exemplary embodiment of the process by which user progresses through the Restriction Period (Time) window of the Dashboard of the valuation system.

FIG. 20 depicts an exemplary process by which user may answer questions in Restriction Period (Time) Properties Window (FIG. 19). The user moves to Restriction Period (Time) Properties window 1900. The slider 1903 will be initially set at the system default. At step 2001, the user expands Restriction Period (Time) Properties Window by selecting Time button 1902 on Restriction Period tab in lower section of Dashboard. At step 2002, the user may refer to Documents Checklist 1904 provided for this specific section as necessary to make sure required documents and information are at hand. At step 2003, the user addresses questions in this section GUI elements 1907-1915 according to desired level of analysis. Additional guidance is provided for Level 2 users 1906. Clicking on each question reveals further guidance as to what questions user should ask, and space is provided for user to make and save notes 1917.

Figure 21:
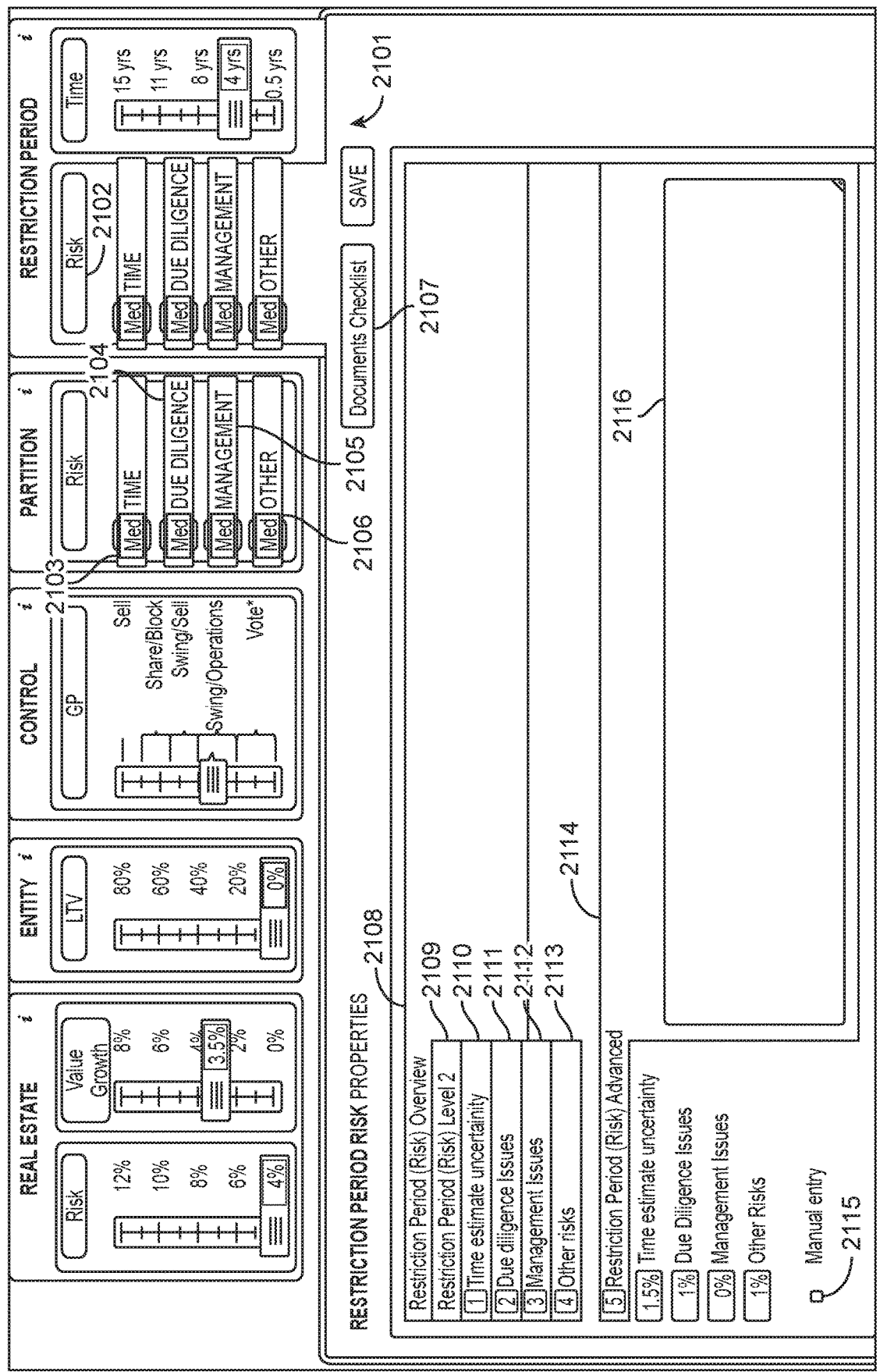
FIG. 21 illustrates an exemplary embodiment of the Restriction Period (Risk) Properties window of the Dashboard of the valuation system.

At step 2004, the user discusses the stability of the real property 1907. At step 2005, the user discusses likelihood of lease renewal, if known 1908. At step 2006, the user discusses (i.e., inputs) the ages of the principals involved and their remaining actuarial life 1909. At step 2007, the user discusses past buyouts, if any 1910. At step 2008, the user discusses right-to-exit issues 1911. At step 2009, the user discusses any potential blocking ability retained by any of the parties 1912. At step 2010, the user discusses remaining term of the entity, including any possibility of extension 1913. At step 2011, the user discusses any withdrawal provisions 1914. At step 2012, the user discusses financing 1915. At step 2013, User concludes a likely restriction period based on the foregoing facts and adjusts slider accordingly 1903. At step 2014, the user continues to Restriction Period (Risk) Properties window 1918 (FIG. 21). FIG. 28 shows a Restriction Period and Risk and Time interface block 2855 corresponding to FIGS. 19 and 21.

Figure 22:
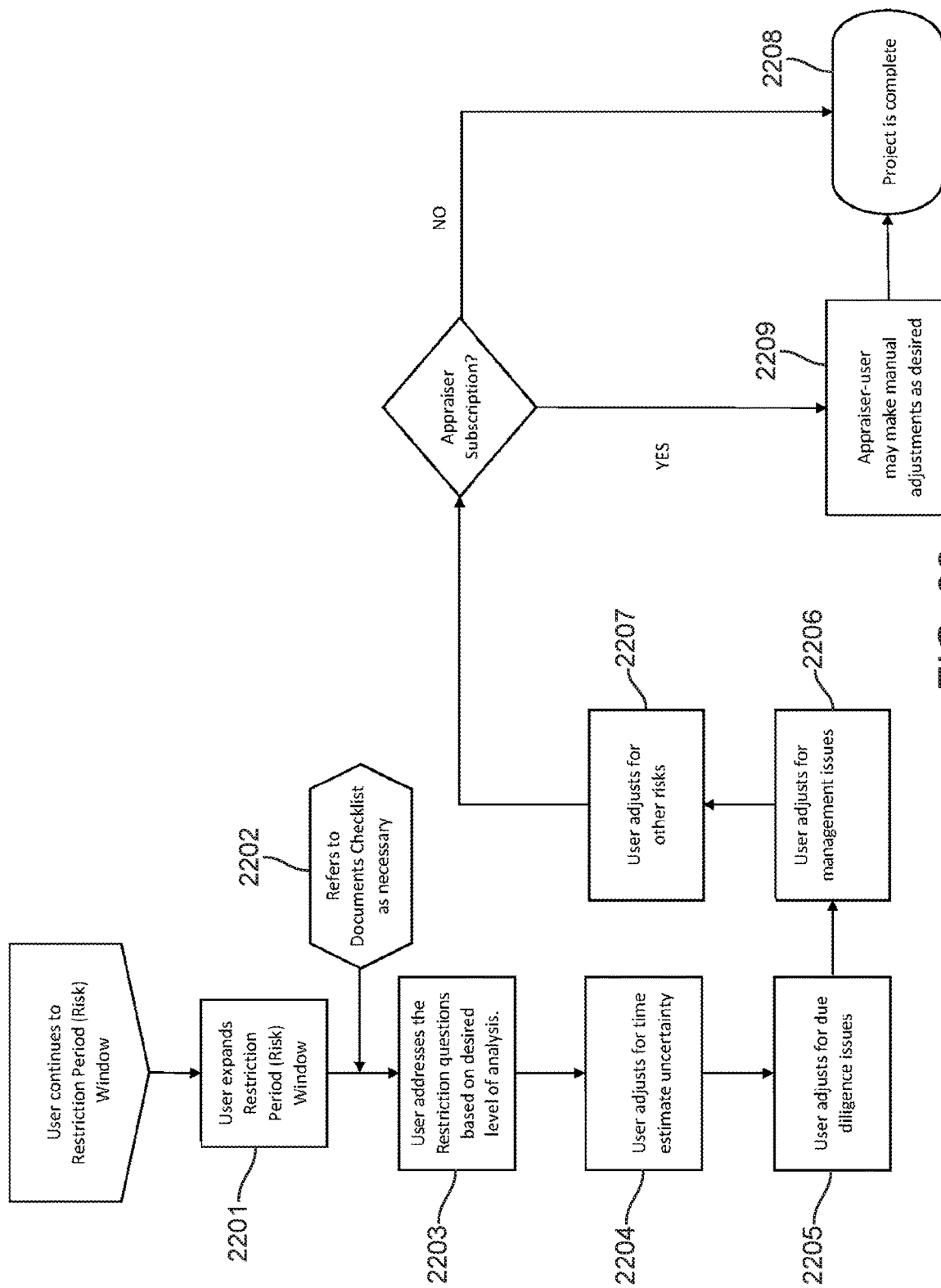
FIG. 22 illustrates an exemplary embodiment of the process by which user progresses through the Restriction Period (Risk) window of the Dashboard of the valuation system.

FIG. 22 depicts an exemplary process by which user may answer questions in Restriction Period (Risk) Properties Window (FIG. 21). The user moves to Restriction Period (Risk) Properties window 2100. Sliders 2103-2106 GUI elements will be initially set at the system defaults. User will adjust the sliders for this section to Low, Med, or High while progressing through the questions in this section. At step 2201, the user expands Restriction Period (Risk) Properties Window by selecting Risk button 2102 on Restriction Period tab 2101 in lower section of Dashboard. At step 2202, the user may refer to Documents Checklist 2107 provided for this specific section as necessary to make sure required documents and information are at hand. At step 2203, the user addresses questions (i.e., inputs answers) GUI elements 2110-2114 in this section according to desired level of analysis. Additional guidance is provided for Level 2 users 2109. Clicking on each question reveals further guidance as to what questions user should ask, and space is provided for user to make and save notes 2116.

At step 2204, the user discusses time estimate uncertainty 2110 and adjusts corresponding slider 2103 accordingly. At step 2205, the user discusses due diligence issues 2111 and adjusts corresponding slider 2104 accordingly. At step 2206, the user discusses management issues 2112 and adjusts corresponding slider 2105 accordingly. At step 2207, the user discusses any other risks 2113 and adjusts corresponding slider 2106 accordingly. For the non-Appraiser-user, the project is complete at step 2208. At step 2209, an Appraiser-user will have a "Restriction Period (Risk) Advanced" section 2114, showing numerical representations of the values for the control adjustments shown on sliders that can be further refined or made outside the range of the sliders if desired by selecting Manual Entry 2115. At this point, the project is now complete for the Appraiser-user.

FIG. 23 illustrates an exemplary embodiment of the My Projects page 2300, whereby the user can view a list of created projects 2301. From this page, the user may load a project to the Dashboard 2302, view the User Valuation Summary for a project in HTML 2303, or download an RTF version of the User Valuation Summary for a project 2304.

FIGS. 24 and 25 illustrate exemplary embodiments of pages from the User Valuation Summary output for a project. This summary output document may show questions asked 2501, answers given 2502, user settings 2401, and results 2402, 2503. For the Appraiser-user, it also details the internal choices made by the algorithm as well as the valuation model equations completed with user-entered variables.

Figure 26:
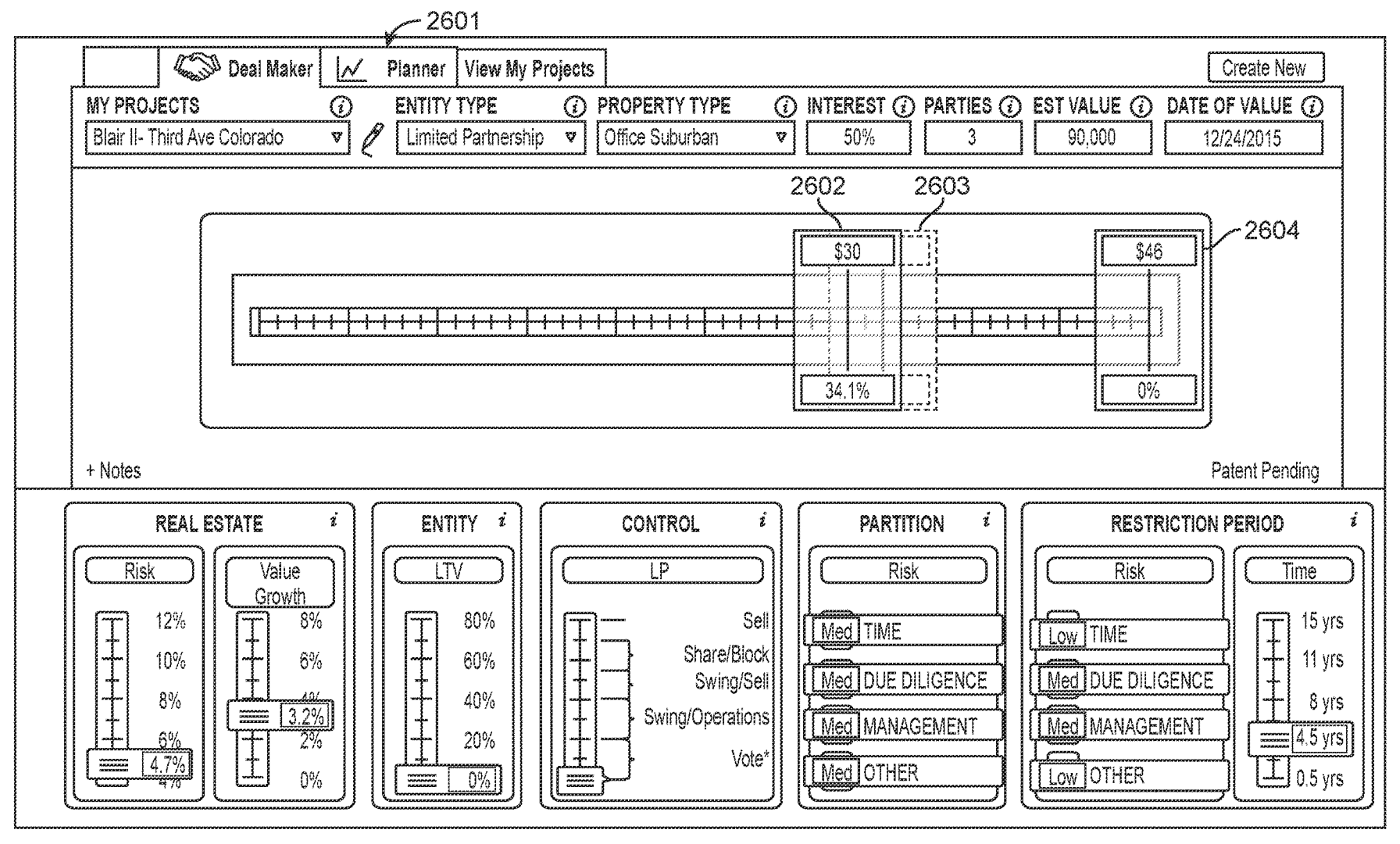

In one embodiment, the valuation system may further include a Deal Maker module (FIG. 26), accessed via the Deal Maker tab 2601 on the Dashboard, that in one implementation allows up to three indicated values 2602-2604 GUI elements to be displayed on the same scale, each based on differing assumptions. Each value represents the interest of a different party in the deal. The user immediately understands how much each change affects value, and how differing interpretations affect the negotiating ranges for the pending buyout transaction.

Figure 27:
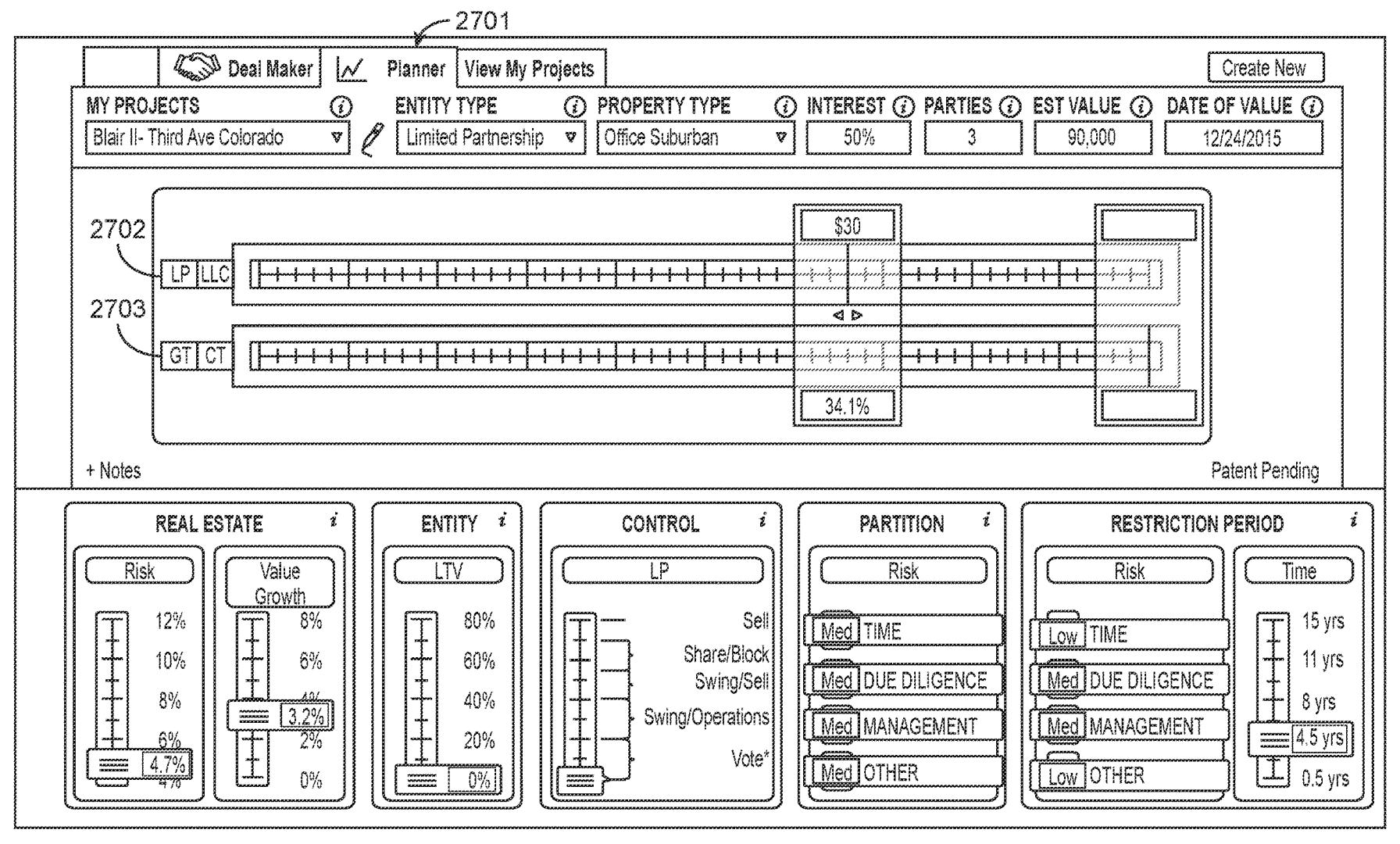

In one embodiment, the valuation system may further include a Planner module (FIG. 27), accessed via the Planner tab 2701 on the Dashboard, that in one implementation allows the user to compare two different entity structures (e.g., a limited partnership to a tenancy-in-common method of holding real estate). The two values represent the same ownership but different structures. This facilitates planning, where there are many competing attributes of organization structures. The valuation system shows the value effect of changing structures.

The valuation process disclosed herein includes the aforementioned valuation algorithm computations module illustrated graphically in the form of a wiring diagram (FIG. 28) and described further herein below. The diagram is organized from the user input screens on the left 2801, with the algorithm's logical functions 2802 and formulas 2803 corresponding to the user screens shown by the wiring connections. The formulas obtain data from the databases shown on the right 2804, as shown by the wiring connections. The computations shown below may comprise any combination of user inputs/adjustments (FIGS. 7, 11, 13, 15, 17, 19, and 21) and system calculations, defaults, and adjustments (FIG. 28).

The constants and other factors of the valuation algorithm 2804 are programmable on the back end to accommodate newer Real Estate Investment Trust (REIT) data, real estate market condition data, loan rates and other elements. The algorithm also includes empirically-developed transfer functions that mimic the appraiser's decision-making process (which models to use under which conditions, which are the most reliable and appropriate, and whose value indications should be given the greatest weight, etc.). These functions also contain constants and factors that can be adjusted to reflect any changes in the real estate appraisal or business valuation bodies of knowledge, or new understandings that have been revealed and accepted by the professions in fractional interest valuation. The ability to make adjustments allows the valuation system to change if needed to reflect valuation current practice. It supports the work of appraisers in current time, and supports the work of advisors by giving them value analysis that is current within the valuation professions. It is a dynamic application that reflects a dynamic profession. The valuation system's formulas, logical functions, and valuation models are described in further detail below.

Entity and Property Type DB 2856 contains a list of entities (corporation, LLC, Limited Partnership, General Partnership, Common Tenancy and others) for the user to choose from. Financial Rates DB 2856 contains risk-free and borrowing rates by quarter. Real Estate Rates DB 2856 contains capitalization and growth rates for a list of property types (Apartments, Industrial, Office and others) by quarter. These rates may be used to generate defaults only. Entity Constants DB 2857 contain default calculation factors for the Entity Properties input screen and range limits for the LTV slider. Black-Scholes constants DB 2858 contains constants used in the Black-Scholes model. Partition Constants DB 2859 contains partition feasibility threshold settings, Partition Properties field defaults, and setting defaults for the partition risk slider switches. Control Adjustment Constants DB 2860 contains default control adjustments that apply for different entity types, as well as range factors used to set the range of the control slider. REIT Yield DB 2861 contains yield factors for different property types by year that are used to compute the REIT-derived yield rate. (REIT=Real Estate Investment Trust). Restriction Risk Data DB 2862 contains risk setting defaults for restriction slider switches and time setting defaults for the time slider, as well as time slider range limits; all are based on entity type. Limit Settings DB 2863 contains user warning threshold settings for real estate cash flow, yield rate, discount and partition discount variables, as well as seller/buyer limit constants. Weighting Constants and Settings DB 2864 contains weighting thresholds and scale factors for each of the formulas 2083.

In one embodiment, the valuation system comprises a web-based (cloud based) computer implemented engine and system for generating a valuation discount for a fractional interest in real estate, over a network, in response to input information concerning the fractional interest. The valuation system includes user-entered fields in a User Setup interface; System-generated defaults for additional fields (below) that allow the system to provide the user with a preliminary value and discount indication; a Documents Checklist where the user is provided with guidance on the process of entering information, the implications of entering information in varying levels of detail/refinement, and system limitations pertaining to facts and circumstances of the user's case; a Real Estate Properties interface where the user refines default variables based on information from real estate professionals; an Entities Properties interface where the user refines default balance sheet and loan detail variables based on accounting information for the entity of which the fractional interest is a part; a Control Properties interface where the user refines default control settings based on legal agreements and other facts and circumstances pertaining to entity management and other attributes of ownership; a Partition Properties interface where the user refines default costs and other conditions relating to a partition lawsuit (when such legal action is applicable); a Restriction Period interface where the user refines a default setting for the number of years that the fractional interest holder should expect to realize its percent share of the entity's net asset value; a Restriction Period interface where the user refines default settings for risks the fractional interest is exposed to during the restriction period.

In one embodiment, the valuation system comprises further comprises: a presentation module for a user display of the concluded value and discount for the real estate fractional interest that shows the magnitude of the value effect for each user setting change, communicating to the user the value sensitivity of such change; a record of the user's answers to questions posed by the system in each of the Input Screens, that organizes the facts and circumstances affecting the value of the fractional interest; a summary of user settings, system questions and user answers, and value conclusions for the user's filing or other reference purpose; additional questions, answer fields and numerical input fields for advanced users (professional appraisers) that allow more in-depth interaction with the engine and system, additional detail, including formulas and their concluded values and explanations of the process used, provided in the user summary, to support advanced users (professional appraisers) in preparing their professional valuation report; an-site reference material hyper-linked to specific user questions, that educates users who are not already expert on the specific points of information needed by the user to make decisions about input adjustments.

Referring to FIG. 28, the Formulas sub-module 2803 of the Algorithm Computations Module 206 comprises the following:

1. A NAV/Yield Calculations Module 2809 Comprises the Following Calculations:

Net asset value (NAV) is the sum of the entity's assets less the sum of its liabilities. Yield is determined as the internal rate of return (IRR) of cash flows and terminal NAV over a 10-year period. Cash flows are the net operating income generated by the real estate (NOI) less additions to working capital and debt service. Terminal value is NAV at the end of the period.

Balance Sheet $$NAV = A_R + A_W + A_O - L_M - L_O$$

Where
$A_R$=Real property value
$A_W$=Working capital
$A_O$=Other assets
$L_M$=Mortgage value
$L_O$=Other liabilities
NAV=Net Asset Value The real estate value $A_R$ and working capital $A_W$ are both increased at the real estate growth rate $G_{RP}$. In year n, $$A_{n \to 1} = A_n(1+G_{RP})$$

Other assets $A_O$ and other liabilities $L_O$ are held constant. The mortgage balance $L_M$ is discussed below.

The terminal NAV is the real estate value $A_R$ in the terminal period (year 10) less selling costs $RP_S$, adjusted for the remaining balance sheet items.

$$NAV_{10} = A_{R_{10}}(1-RP_S) + A_{W_{10}} + A_{O_{10}} - A_{LM_{10}} - L_{O_{10}}$$

Mortgage Loan and Debt Service

Type=Fixed/declining balance or interest only. Adjustable rates are not allowed. The payment calculation for a fixed interest rate/declining balance type is:

$$PMT = \frac{\frac{int}{12} \times PV}{1 - \left(1 + \frac{int}{12}\right)^{-(amort)}}$$

int=Mortgage interest rate
amort=Amortization (mos)
PMT=Payment (monthly)
PV=Initial loan amount $$LTV = L_M/A_R$$

$$LT_{NAV} = L_M/NAV$$

The interest is calculated on an annual basis:

$$interest = int \times L_M$$

And then the principal payment is 12 months of payments less annual interest:

$$principal = PMT \times 12 - interest$$

The mortgage balance is reduced by the principal payments:

$$L_{M(n+1)} = L_{M(n)} - (PMT \times 12 - int \times L_{M(n)})$$

Both payment and interest formulas are approximations. Both can be calculated based on monthly payments for each 12-month period.

The payment calculation for an interest only type is much simpler. It would normally be calculated on the initial balance (PV), but since there may have been partial payments of principal before the date of value, the current mortgage balance ($L_M$) is used:

$$PMT = int/12 \times L_M$$

Principal payments in this case are zero, and the mortgage balance remains constant.

Cash Flow

The first year's NOI is determined from the estimated real property value $A_R$ and the capitalization rate $R_{RP}$.

$$NOI = A_R \times R_{RP}$$

Annual cash flows are calculated as:

$$CF = NOI + \Delta A_W + \Delta A_O - \Delta L_M - \Delta L_O$$

$A_O$ and $L_O$ do not change, and $L_M$ changes with principal payments.

NOI is increased at the real estate growth rate for the partition period $GV_{PART}$ $$NOI_{n+1} = NOI_n(1+GV_{PART})$$

Yield and Growth Analysis

The present value of cash flows is net operating income (NOI). The asset-level yield rate YA is determined as the internal rate of return (IRR) of cash flows and terminal NAV over a 10-year period (not N years). The IRR is a yield rate that makes the net present value equal to NAV.

Value growth is calculated as the annually compounded rate that will grow year 1 NAV to year 10 NAV over the period:

$$GV_A = \left(\frac{NAV_{10}}{NAV}\right)^{\frac{1}{10}} - 1$$

Cash flow growth is calculated similarly as the annually compounded rate that will grow year 1 CF to year 10 CF over the period:

$$GV_A = \left(\frac{CF_{10}}{CF}\right)^{\left(\frac{1}{10-1}\right)} - 1$$

The cash flow rate is then calculated as the year 1 cash flow on NAV:

$$R_{CF} = \frac{CF}{NAV}$$

2. A Black Scholes Model Module 2811 Comprises the Following Calculations:

The basic Black-Scholes formula for European put options is:

$$P = Re^{-rt}N(z) - SN(y), \text{ where}$$

S=price of the underlying asset
P=put option price and K=option exercise price
t=time to expiration (holding time) in years=N r=risk-free interest rate=$R_F$
σ=volatility
Let K=1
The discount is:

$$D_{BS} = \frac{P}{S} = \frac{e^{-rt}N(z)}{S} - N(y)$$

N(x)=standard normal distribution function:

$$N(x) \cong 1 - \frac{e^{-\frac{x^2}{2}}}{\sqrt{2\pi}}(b_1 k + b_2 k^2 + b_3 k^3) \text{ and } k = \frac{1}{1+ax}$$

a=0.33267; $b_1$=0.4361836; $b_2$=−0.1201676; $b_3$=0.9372980

$$y = \frac{\ln\left(\frac{ke^{-rt}}{S}\right)}{\sigma\sqrt{t}} - \frac{\sigma\sqrt{t}}{2} \text{ and } z = y + \sigma\sqrt{t}$$

Substitute y and z for x to get N(y) and N(z)
The volatility term is from an empirical linear approximation:

$$\sigma = \frac{R_M - c}{b} \text{ where } b = 0.2143 \text{ and } c = 0.0057$$

$R_M$=effective risk premium
Include dividends by substituting for S:

$$S' = 1 + R_{CF}\left(\frac{1 - (1 + G_{CF})^t/(1 + Y_{AC})^t}{Y_{AC} - G_{CF}}\right) \text{ where}$$

$R_{CF}$=dividend or distribution rate (cash flow÷net asset value)
$G_{CF}$=dividend growth rate
$Y_{AC}$=discount (yield) rate $$D_{BS} = \frac{e^{-rt}N(z)}{S'} - N(y)$$

3. A Present Value Model 1 Module 2810 Comprises the Following Calculations:
This model calculates the present value of future benefits, cash flows and the interest's pro rata share of NAV at the end of the restriction period N based on a risk-adjusted yield rate $Y_{AC}$. The basic formulae are:

PV=$PV_V$+$PV_D$

Where
$PV_V$=the present value of asset
$PV_D$=the present value of dividends
In order to calculate the discount, let the current asset value=$1, then $$PV_V = \frac{FV}{(1+I_R)^n}$$

$$FV = (1+I_V)^n$$

Where
$I_R$=investor's required return adjusted by user=$Y_{AC}$
$I_V$=value growth rate=$GV_A$
n=number of years=N $$PV_V = \frac{(1+GV_A)^N}{(1+Y_{AC})^N}$$

$$PV_D = R_{CF} \times \left[1 - \frac{(1+GV_A)^N}{(1+Y_{AC})^N}\right] / (Y_I - G_{CF})$$

$R_{CF}$=cash flow (distribution) rate
$G_{CF}$=cash flow (distribution) growth rate $$D_{PV} = (1 - PV)$$

$$D_{PV} = 1 - PV_V - PV_D$$

$$D_{PV} = 1 - \frac{(1+GV_A)^N}{(1+Y_{AC})^N} - R_{CF} \times \left[1 - \frac{(1+G_{CF})^N}{(1+Y_{AC})^N}\right] / (Y_{AC} - G_{CF})$$

4. A Present Value Model 2 Module 2814 Comprises the Following Calculations:

This model calculates the present value of future benefits, cash flows and the interest's pro rata share of NAV at the end of the restriction period N based on a risk-adjusted yield rate $Y_{AC}$. In this case, the risk-adjusted yield, growth and other rates are also adjusted for the control discount $D_C$ developed from the REIT database. The basic formulae are:

PV=$PV_V$+$PV_D$

Where
$PV_V$=the present value of asset
$PV_D$=the present value of dividends
In order to calculate the discount, let the current asset value=$1, then $$PV_V = \frac{FV}{(1+I_R)^n}$$

$$FV = (1+I_V)^n$$

Where
$I_R$=investor's required return adjusted for control and by user=$Y_I$
$I_V$=value growth rate adjusted for control=$GV_C$
n=number of years=N $$PV_V = \frac{(1+GV_C)^N}{(1+Y_I)^n}$$

$$PV_D = R_{CM} \times \left[1 - \frac{(1+GV_C)^N}{(1+Y_I)^N}\right] / (Y_I - G_{CF})$$

$R_{CM}$=cash flow (distribution) rate adjusted for control
$G_{CF}$=cash flow (distribution) growth rate (not changed for control)

$$D_M = (1 - PV)$$

$$D_M = 1 - PV_V - PV_D$$

$$D_M = 1 - \frac{(1+GV_C)^N}{(1+Y_I)^N} - R_{CM} \times \left[1 - \frac{(1+GV_C)^N}{(1+Y_I)^N}\right] / (Y_I - G_{CF})$$

5. A Partition (DCF) Calculations Module 2812 Comprises the Following Calculations:

The asset value grows for N years, and then is sold (or physically divided), and transaction costs are deducted. Other balance sheet items also change over the period, and the sale proceeds are adjusted. The net amount is then discounted back at a risk-adjusted yield rate. Annual cash flows are also discounted back at the same rate.

Expected litigation costs are spread ratably over the term, and discounted back at an expected borrowing rate.

The sum of the present values, divided by the current net asset value, is the present value as a percent of initial value, and (1−this amount) is the discount.

$N_P$=Number of years, selected between 1 and 5 years in 0.5 year increments.

N=$n^{th}$ year, taken as 1 for the first period and n+0.5 for each subsequent period.

Balance Sheet

The balance sheet from Entity Properties is:

NAV=$A_R$+$A_W$+$A_O$−$A_{LM}$−$L_O$

The real estate value $A_R$ and working capital $A_W$ are both increased at the real estate growth rate for the partition period $GV_{PART}$. In year n, $A_{n+1}$=$A_n$(1+$GV_{PART}$)

Other assets $A_O$ and other liabilities $L_O$ are held constant. The mortgage balance $L_M$ is discussed below.

The terminal NAV is the real estate value $A_R$ in the terminal period $N_P$ (in which n=$N_P$) less selling costs $P_S$, adjusted for the remaining balance sheet items.

NAV$_N$=$A_R$(1−$P_S$)+$A_{W_N}$+$A_{O_N}$−$A_{LM_N}$−$L_{O_N}$

Mortgage Loan and Debt Service

Loan parameters PMT and int are taken from the NAV/Yield Calculations ($L_M$ is negative).

Let $M_n$=Number of months in period n $M_{n+1}$=⌈(n+1)−(n)⌉×12

Debt service$_{n+1}$=PMT×$M_{n+1}$ $L_{M(n+1)}$=$L_{M(n)}$+(PMT×$M_{n+1}$×12+int×$L_{M(n)}$×$M_{n+1}$)

This last formula is an approximation. It would be better to have the interest amount calculated based on monthly payments over each 6-month period.

Cash Flow

Annual cash flows are calculated as:

CF=NOI+Δ$A_W$+Δ$A_O$−Δ$L_M$−Δ$L_O$ $A_O$ and $L_O$ do not change, and $L_M$ changes with principal payments.

NOI is increased at the real estate growth rate for the partition period $GV_{PART}$.

NOI$_{n+1}$=NOI$_n$(1+$GV_{PART}$)

Litigation Costs $P_{COST}$=total litigation costs (negative)

These are divided evenly over the periods following the first year:

$P_{COST(n+1)}$=$P_{COST}$/[($N_P$−1)×12]×$M_{n+1}$×12

$R_B$=borrowing cost

Present Value of Cash Flows $$PV_{CF} = \sum \left[\frac{CF_1}{(1+Y_P)^1} + \frac{CF_2}{(1+Y_P)^2} + \ldots + \frac{CF_{N_P}}{(1+Y_P)^{N_P}}\right]$$

Present Value of the Litigation Cost Stream (Negative)

$$PV_{COST} = \sum \left[\frac{P_{COST(2)}}{(1+R_B)^2} + \frac{P_{COST(3)}}{(1+R_B)^2} + \ldots + \frac{P_{COST(N_P)}}{(1+R_B)^{N_P}}\right]$$

The Concluded Discount $D_P$=discount based on partition $D_P$=1−PV $D_P$=1−(PV$_V$+PV$_{CF}$+PV$_{COST}$)

6. A REIT Database Calculations Module 2813 Comprises the Following Calculations:

The REIT yield database REIT_YieldDB is uploaded to the database section. Variable $Y_S$ is a function of property type (RTYPE) and the date year (DATEYR), $Y_S$ is a constant:

$Y_R$=$Y_S$+$Y_A$ $Y_C$=$Y_R$−$A_{CR}$

Discount Calculation

The minority-level yield rate $Y_{RA}$ is determined above. The present value of each years' cash flow (see NAV/Yield Calculations) is calculated as:

$$PV_{CFn} = \frac{CFn}{(1+Y_{RA})^n}$$

The sum of the PV$_{CFn}$ values over the 10-year period is the minority-marketable net asset value NAV$_{MM}$. The discount for lack of control is then:

$D_C$=1−NAV$_{MM}$/NAV

Referring to FIG. 28, in the Logical Functions sub-module 2802 of the Algorithm Computations Module 206, the various rates, values and intermediate calculations are taken from user inputs and internal formulas and applied for other formulas using many conditional functions and calculations grouped together. Data are provided in various tables and as labeled constants. The purpose of including data and constants in a separate section is so these elements can be accessible and readily changed by a website administrator.

The Logical Functions Sub-module 2802 comprises the following:

1. Real Estate Adjustments 2805 as Follows:

All sliders in the GUI Dashboards adjust from 0 to 10 in increments of at least 0.01. The outputs are then scaled to match linear or nonlinear variables.

S=Slider value (0-10 scale)

$S_{MIN}$=Slider minimum value $S_{MAX}$=Slider maximum value $$R_{RP} = \frac{S_{RP}}{(S_{MAX} - S_{MIN})} \times (R_{RPMAX} - R_{RPMIN}) + R_{RPMIN}$$

Where
$S_{RP}$=Capitalization rate slider value
$R_{RP}$=Capitalization rate
$R_{RPMAX}$=Cap rate maximum value
$R_{RPMAX}$=Cap rate minimum value $$G_{RP} = \frac{S_{RP}}{(S_{MAX} - S_{MIN})} \times (G_{RPMAX} - G_{RPMIN}) + G_{RPMIN}$$

Where
$S_{RPG}$=Growth rate slider value
$G_{RP}$=Growth rate
$G_{RPMAX}$=Growth maximum value
$G_{RPMAX}$=Yield minimum value
The growth and cap rate maximum and minimum values are constants for now, but could vary with property type and date, in which case they would refer to a database.

2. Control-Related Adjustments as Follows:
The control slider also adjusts from 0 to 10. This adjustment affects four different formulas in different ways, depending on the type of entity and the requirements of the formula.
S=Slider value (0-10 scale)
$S_{MIN}$=Slider minimum value
$S_{MAX}$=Slider maximum value
Entity Type: LP or Greater $$A_{CR} = Y_S \times \left(\frac{S}{S_{MAX}}\right)$$

Where
$A_{CR}$=Yield adjustment for $Y_C$
Entity Type: GP or Common Tenancy, Present Value 2 and B-S $$A_{CG} = \left(1 - \frac{S}{S_{MAX}}\right)$$

Where
$A_{CG}$=Yield adjustment for $Y_{AC}$
Entity Type: GP or Common Tenancy, Partition $$A_{CPART} = \left(1 - \frac{S}{S_{MAX}}\right)$$

Where
$A_{CPART}$=Yield adjustment for $Y_P$

3. Yield Buildup and Restriction Adjustments 2807 as Follows:
Restriction Adjustments:
These are yield rate and discount adjustments based on the user's input concerning four different causes of risk that emerge from the interest holder's restricted condition (user cannot exit the investment, nor realize his pro rata share of NAV for the restriction period).
This section concerns the GUI-selected values which are a function of entity type. The Restriction user adjustment has four elements, each of which offers three choices: high, mid and low. The outputs are numbered 1-12: Time high=1, mid=2, low=3; Due Diligence 4-5-6; Management 7-8-9; and Other 10-11-12. There are different constants based on entity type and application (the particular formula in which the adjusted yield or discount will be used).
Entity/Application Type: LP or Greater, PV 2

$$A_X = a \times m$$

Where
$A_1$=Adjustment for restriction period
$A_2$=Adjustment for due diligence
$A_3$=Adjustment for management risk
$A_4$=Adjustment for other risk
a=constant associated with the high, med, low UI reference
m=constant for each entity/application type
Entity/Application Type: CT or GP; PV 1, B-S $$A_X = a \times m$$

Entity/Application Type: CT or GP; Partition $$A_X = u \times m$$

Entity/Application Type: CT or GP $$A_1 = a_{PV1-BS} \times m \times q$$

In this instance, the function makes use of constant from the CT or GP; PV 1, B-S heading. The function only applies for the restriction period selection (1).
Entity/Application Type: CT or GP; B-S $$A_X = a \times m$$

Restriction Period:
This GUI Dashboard slider also adjusts from 0 to 10 in increments of at least 0.01. The outputs generate a nonlinear value for N, the number of years in the restriction period.

$$N = \frac{S+1}{2} + \left(\frac{S}{C_{TA}}\right)^{C_{TP}}$$

Where
S=Slider output value (0-10)
$C_{TP}$=Power constant
$C_{TA}$—Adjustment constant
A warning is issued when the user tries to enter a period directly that is outside boundaries for N. Methods for generating warnings are not established.
$N_U$=Period upper limit (years)
$N_L$=Period lower limit (years)
Yield Buildup:
The outputs from the restriction period and control user interface for the four causes of risk are assembled in risk buildup models that generate the risk rates used by particular application formulas.
Entity/Application Type: LP or Greater, PV 2
The yield $Y_C$ is selected directly from the REIT database, and the discount was calculated.

$$GV_C = GV_A/(1-D_C)$$

$$R_{CM} = R_{CF}/(1-D_C)$$

Where
The other variables are used in the Present Value 2 formula. The remaining variable, $G_{CF}$, is unchanged (cash flow growth is not altered by adjusting NAV for $D_C$).
Then $$Y_1 = Y_C + A_1 + A_2 + A_3 + A_4$$

$A_1$ through $A_4$ are user yield adjustments for restriction period, due diligence, management and other risk influences for this application.

Entity/Application Type: CT or GP; PV 1, B-S $$Y_{AC} = Y_A + A_1 + A_2 + A_3 + A_4 + A_{CG}$$

$A_1$ through $A_4$ are user yield adjustments for restriction period, due diligence, management and other risk influences for this application.

Entity/Application Type: CT or GP; Partition $$Y_P = Y_A + A_1 + A_2 + A_3 + A_4 + A_{CPART}$$

$A_1$ through $A_4$ are user yield adjustments for restriction period, due diligence, management and other risk influences for this application.

Entity/Application Type: CT or GP; B-S $$R_M = Y_{AC} + (G_{PUB} - GV_A) \times C_{YBS} + A_{LBS} - R_F$$

Where
$Y_{AC}$=investor's required return from GP/CT above
$G_{PUB}$=Reference constant for public company growth
$GV_A$=value growth rate
$C_{YBS}$=Yield multiplier
$A_{LBS}$=Reference constant for liquidity (this might need a lookup table in the future)
$R_F$=Risk-free rate from the financial rates database. Varies with the date of value.

4. Reconciliation and Weighting 2808 as Follows:

The discount conclusions $D_X$ from the four formula models are given weight in determining the concluding discount depending on many elements. The primary variables are entity type, level of control, restriction period, and the pro rata value of the interest being valued.

REIT Database and Present Value 2

$$W_1 = TPE \times P_1 \times (C_1 + T_1)$$

Where
TPE=1 if ETYPE>3 (Partnerships and above), otherwise 0

$$C_1 = 1 \text{ if } S \times CS_{gb} < C_{1a}$$
$$C_1 = 0 \text{ if } \frac{(S \times CS_{gb} - C_{1a}) \times 2}{C_{1b}} \geq 1$$
$$C_1 = 1 - \left(\frac{(S \times CS_{gb} - C_{1a}) \times 2}{C_{1b}}\right)$$
$$T_1 = 1 \text{ if } N > NU_1$$
$$T_1 = 0 \text{ if } \frac{NL_1 \times (NU_1 - N)}{NU_g} \geq 1$$
$$T_1 = 1 - \left(\frac{NL_1 \times (NU_1 - N)}{NU_g}\right)$$

$CS_X$ $NU_X$ $NL_X$ $C1_X$ $C2_X$ $PU_X$ and $M_X$ are weighting constants, and $F_X$ is for future use (typical)
S is the control slider scale (0-10 unadjusted)
N is the restricted period in years Present Value 1

$$W_1 = TPE \times F_1 \times T_1$$

Where
TPE=1 if ETYPE<4 (CT, GP and RP), otherwise 0

$$T_2 = 1 \text{ if } N > NU_2$$
$$T_2 = 0 \text{ if } \frac{NL_2 \times (NU_2 - N)}{NU_g} \geq 1$$
$$T_2 = 1 - \left(\frac{NL_2 \times (NU_2 - N)}{NU_g}\right)$$

Partition $$W_3 = TPE \times F_3 \times U_3$$

Where
TPE=1 if ETYPE<4 and >1 (CT, GP) and $P_{ON}$=1, otherwise 0

$$U_3 = 1 \text{ if } V_{EM} > PL_3$$
$$U_3 = 0 \text{ if } \frac{M_3 \times (PL_3 - V_{EM})}{PU_3} \geq 1$$
$$U_3 = 1 - \left(\frac{M_3 \times (PL_3 - V_{EM})}{PU_3}\right)$$
$$V_{EM} = (NAV \times PCT)/1{,}000$$

$V_{EM}$=subject interest's pro rata share of NAV in 000s, and
PCT=subject interest Black-Scholes $$W_5 = TPE \times F_5 \times T_5$$

Where
TPE=1 if ETYPE<4 (CT, GP and RP), otherwise 0

$$T_5 = 1 \text{ if } N > NU_5$$
$$T_5 = 0 \text{ if } \frac{NL_5 \times (NU_5 - N)}{NU_g} \geq 1 \quad T_5 = 1 - \left(\frac{NL_5 \times (NU_5 - N)}{NU_g}\right)$$

Weighted Conclusion $$D_W = \frac{W_1 \times D_{PTR} + W_2 \times D_{PV} + W_3 \times D_P + W_5 \times D_{BS}}{\sum (W_1 \ldots W_5)}$$

Where $$D_{PTR} = 1 - (1 - D_C)(1 - D_M)$$

$D_C$=Discount for lack of control
$D_M$=Discount for lack of marketability from PV2
$D_W$=Weighted discount Reconciliation/Willing Seller and Buyer Limits:
This formula compresses extreme discounts based on the idea that a seller would not sell at close to zero, nor would a buyer buy at close to 100% except under extraordinary circumstances. The algorithm will not process such extraordinary circumstances, and so compresses the conclusion when the weighted discount approaches set thresholds.

Willing Buyer
$D_W$=Weighted discount from previous section
$DT_B$=The buyer's first % threshold
$DF_B$=The buyer's scale factor
$DR_B$=The buyer's second % threshold
If $DR_B < D_W < DT_B$, then $$D = DT_B - BF \times (DT_B - D_W), \text{ where}$$

$$BF = 1 \text{ if } D_W > DT_B, \text{ otherwise} = 1 - (DT_B - D_W) \times DF_B$$

If $D_W < DR_B$, then $$D = DT_B - (1 - (DT_B - DR_B) \times DF_B) \times (DT_B - DR_B)$$

Willing Seller
$DT_S$=The seller's first % threshold
$DF_S$=The seller's scale factor
$DR_S$=The seller's second % threshold
If $DR_S > D_W > DT_S$, then $$D = DT_S + SF \times (D_W - DT_S), \text{ where}$$

$$SF=1 \text{ if } D_W < DT_S, \text{ otherwise}=1-(D_W-DT_S) \times DF_S$$

If $D_W > DR_S$, then $$D = DT_S + (1-(DR_S-DT_S) \times DF_S) \times (DR_S-DT_S)$$

The conclusion is rounded to four significant digits, and displayed as two.

Embodiments disclosed herein further provide benefits, including: 1) automated valuation, less expensive and more reliable than conventional approaches, 2) increased valuation capability of business and real estate appraisers who wish to provide undivided or fractional interest valuation services, 3) enabling less-specialized practitioners to perform quality work, 4) enabling education of the market for valuation services, which can effectively prevent incompetent appraisers from selling inadequate valuation work to an unsuspecting public, 5) less prone to built-in bias than conventional methods, 6) valuation process, interview questions and algorithm embody 20 years of experience and wisdom by the inventor, and 7) valuation process directly addresses the fundamental issues that have adversely affected valuation quality as expressed by valuation representatives of taxing bodies in public forums.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 29:
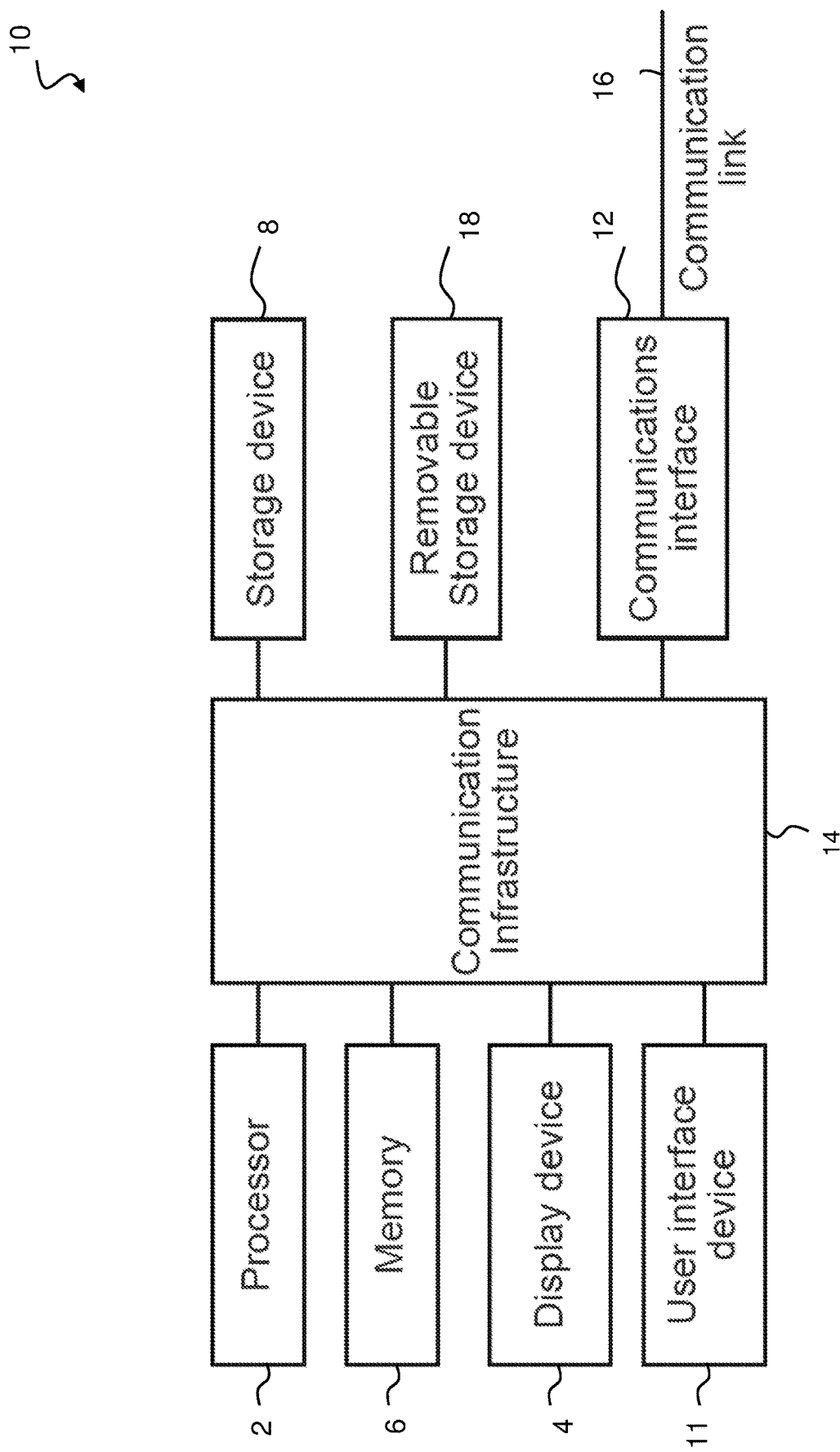
FIG. 29 shows a high-level block diagram and process of a computing system for implementing an embodiment of the valuation system and process.

FIG. 29 is a high-level block diagram 10 showing a computing system comprising a computer system useful for implementing an embodiment of the system and process, disclosed herein. Embodiments of the valuation system disclosed herein may be implemented in different computing environments. The computer system includes one or more processors 2, and can further include an electronic display device 4 (e.g., for displaying graphics, text, and other data), a main memory 6 (e.g., random access memory (RAM)), storage device 8, a removable storage device 18 (e.g., removable storage drive, a removable memory module, a magnetic tape drive, an optical disk drive, a computer readable medium having stored therein computer software and/or data), user interface device 11 (e.g., keyboard, touch screen, keypad, pointing device), and a communication interface 12 (e.g., modem, a network interface (such as an Ethernet card), a communications port, or a PCMCIA slot and card). The communication interface 12 allows software and data to be transferred between the computer system and external devices. The system further includes a communications infrastructure 14 (e.g., a communications bus, cross-over bar, or network) to which the aforementioned devices/modules are connected as shown. Information transferred via communications interface 12 may be in the form of signals such as electronic, electromagnetic, optical, or other signals capable of being received by communications interface 12, via a communication link 16 that carries signals and may be implemented using wire or cable, fiber optics, a phone line, a cellular/mobile phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments have been described with reference to flowchart illustrations and/or block diagrams of methods, apparatus (systems) and computer program products according to embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments. In alternative implementations, the functions noted in the blocks may occur out of the order noted in the figures, concurrently, etc.

Computer programs (i.e., computer control logic) are stored in main memory and/or secondary memory. Computer programs may also be received via a communications interface 12. Such computer programs, when executed, enable the computer system to perform the features of the embodiments as discussed herein. In particular, the computer programs, when executed, enable the processor and/or multi-core processor to perform the features of the computer system. Such computer programs represent a valuation engine of the valuation system.

Figure 30:
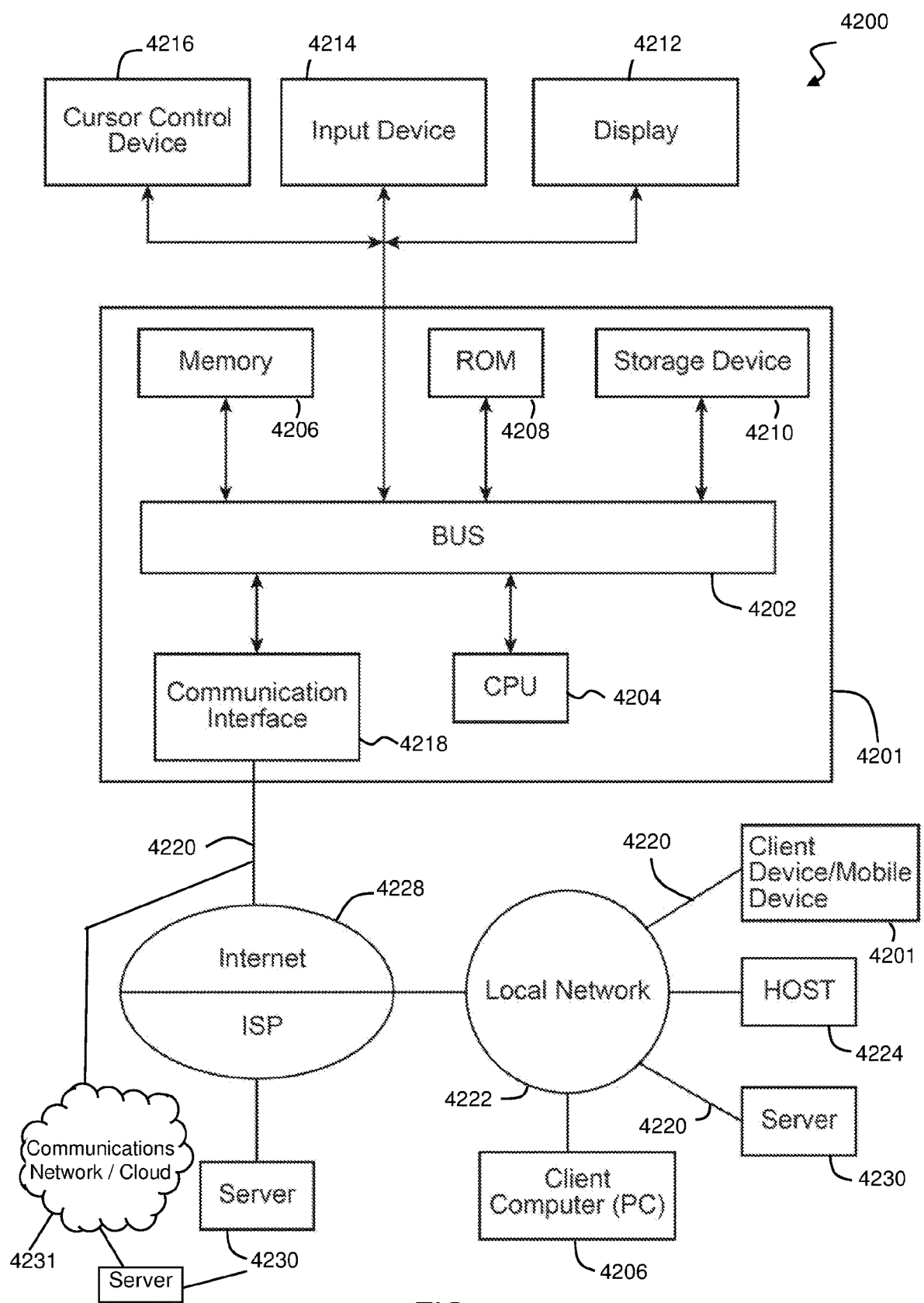
FIG. 30 shows a block diagram and process of an exemplary system in which an embodiment may be implemented.

FIG. 30 shows a block diagram of an example computing environment system 4200 in which an embodiment may be implemented. The system 4200 includes one or more computing devices 4201 connected to one or more server computing systems such as servers 4230. A server 4230 may comprise computing elements such as system 10 shown in FIG. 29. A server may also comprise the computing elements of a computing device 4201, described below. A client device may also comprise the computing elements of a computing device 4201, described below.

A computing device 4201 may include a bus 4202 or other communication mechanism for communicating information, and a processor (CPU) 4204 coupled with the bus 4202 for processing information. The device 4201 also includes a main memory 4206, such as a random access memory (RAM) or other dynamic storage device, coupled to the bus 4202 for storing information and instructions to be executed by the processor 4204. The main memory 4206 also may be used for storing temporary variables or other intermediate information during execution or instructions to be executed by the processor 4204. The device 4201 further includes a read only memory (ROM) 4208 or other static storage device coupled to the bus 4202 for storing static information and instructions for the processor 4204. A storage device

4210, such as a magnetic disk or optical disk, is provided and coupled to the bus 4202 for storing information and instructions. The bus 4202 may contain, for example, thirty-two address lines for addressing video memory or main memory 4206. The bus 4202 can also include, for example, a 32-bit data bus for transferring data between and among the components, such as the CPU 4204, the main memory 4206, video memory and the storage 4210. Alternatively, multiplex data/address lines may be used instead of separate data and address lines.

The device 4201 may be coupled via the bus 4202 to a display 4212 for displaying information to a computer user. An input device 4214, including alphanumeric and other keys, is coupled to the bus 4202 for communicating information and command selections to the processor 4204. Another type or user input device comprises cursor control 4216, such as a mouse, a trackball, or cursor direction keys for communicating direction information and command selections to the processor 4204 and for controlling cursor movement on the display 4212.

According to one embodiment, the functions are performed by the processor 4204 executing one or more sequences of one or more instructions contained in the main memory 4206. Such instructions may be read into the main memory 4206 from another computer-readable medium, such as the storage device 4210. Execution of the sequences of instructions contained in the main memory 4206 causes the processor 4204 to perform the valuation process steps described herein. One or more processors in a multi-processing arrangement may also be employed to execute the sequences of instructions contained in the main memory 4206. In alternative embodiments, hard-wired circuitry may be used in place of or in combination with software instructions to implement the embodiments. Thus, embodiments are not limited to any specific combination of hardware circuitry and software.

The terms "computer program medium," "computer usable medium," "computer readable medium", and "computer program product," "non-transitory computer readable medium", are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor multi-core processor to perform the features of the computer system. Accordingly, such computer programs represent valuations systems disclosed herein.

Generally, the term "computer-readable medium" as used herein refers to any medium that participated in providing instructions to the processor 4204 for execution. Such a medium may take many forms, including but not limited to, non-volatile media, volatile media, and transmission media. Non-volatile media includes, for example, optical or magnetic disks, such as the storage device 4210. Volatile media includes dynamic memory, such as the main memory 4206. Transmission media includes coaxial cables, copper wire and fiber optics, including the wires that comprise the bus 4202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 4204 for execution. For example, the instructions may initially be carried on a magnetic disk of a remote computer. The remote computer can load the instructions into its dynamic memory and send the instructions over a telephone line using a modem. A modem local to the device 4201 can receive the data on the telephone line and use an infrared transmitter to convert the data to an infrared signal. An infrared detector coupled to the bus 4202 can receive the data carried in the infrared signal and place the data on the bus 4202. The bus 4202 carries the data to the main memory 4206, from which the processor 4204 retrieves and executes the instructions. The instructions received from the main memory 4206 may optionally be stored on the storage device 4210 either before or after execution by the processor 4204.

The device 4210 also includes a communication interface 4218 coupled to the bus 4202. The communication interface 4218 provides a two-way data communication coupling to a network link 4220 that is connected to a cloud computing system 4231, to the world wide packet data communication network commonly referred to as the Internet 4228, or other communication network. The Internet 4228 uses electrical, electromagnetic or optical signals that carry digital data streams. The signals through the various networks and the signals on the network link 4220 and through the communication interface 4218, which carry the digital data between devices 4201, 4230, 4206 and 4224, are exemplary forms or carrier waves transporting the information.

In another embodiment, interface 4218 is connected to a network 4222 via a communication link 4220. For example, the communication interface 4218 may be an integrated services digital network (ISDN) card or a modem to provide a data communication connection to a corresponding type of communication link, which can comprise part of the network link 4220. As another example, the communication interface 4218 may be a local area network (LAN) card to provide a data communication connection to a compatible LAN. Wireless links may also be implemented. In any such implementation, the communication interface 4218 sends and receives electrical electromagnetic or optical signals that carry digital data streams representing various types of information.

The network link 4220 typically provides data communication through one or more networks to other data devices. For example, the network link 4220 may provide a connection through the local network 4222 to a host computer 4224 or to data equipment operated by an Internet Service Provider (ISP). The ISP in turn provides data communication services through the Internet 4228. The local network 4222 and the Internet 4228 both use electrical, electromagnetic or optical signals that carry digital data streams. The signals through the various networks and the signals on the network link 4220 and through the communication interface 4218, which carry the digital data to and from the devices 4201, 4230, 4224, are exemplary forms or carrier waves transporting the information.

A server 4230 can send/receive messages and data, including e-mail, program code, through the network, the network link 4220 and the communication interface 4218. Further, the communication interface 4218 can comprise a USB/Tuner and the network link 4220 may be an antenna or cable for connecting the server 4230 to a cable provider, satellite provider or other terrestrial transmission system for receiving messages, data and program code from another source.

The example versions of the embodiments described herein may be implemented as logical operations in a distributed processing system such as the system 4200 including the servers 4230. The logical operations of the embodiments may be implemented as a sequence of steps executing in e.g. the server 4230 or devices 4201, 4206, and as interconnected machine modules within the system 4200. The implementation is a matter of choice and can depend on performance of the system 4200 implementing the embodiments. As such, the logical operations constituting said example versions of the embodiments are referred to for e.g., as operations, steps or modules.

Similar to a server 4230 described above, a client device 4201 can include a processor, memory, storage device, display, input device and communication interface (e.g., e-mail interface) for connecting the client device to the Internet 4228, the ISP, or LAN 4222, for communication with the servers 4230.

The system 4200 can further include computers (e.g., personal computers, computing nodes) operating in the same manner as client devices 4201, wherein a user can utilize one or more computers to manage data in the server 4230.

Figure 31:
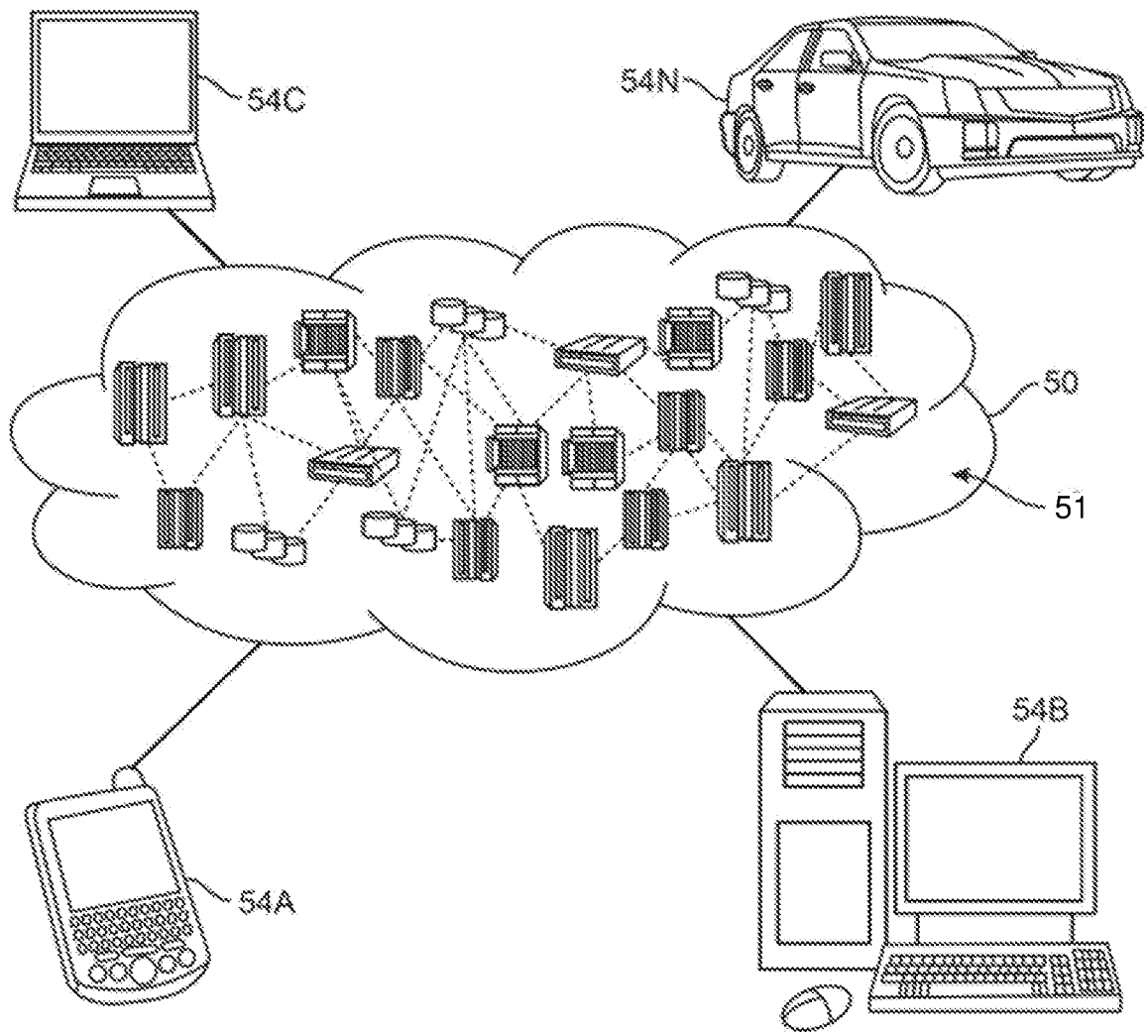
FIG. 31 depicts a cloud computing environment for implementing an embodiment of the valuation system and process disclosed herein.

Referring now to FIG. 31, illustrative cloud computing environment 50 is depicted. As shown, cloud computing environment 50 comprises one or more cloud computing nodes 51 with which local computing devices used by cloud consumers, such as, for example, personal digital assistant (PDA), smartphone, smart watch, set-top box, video game system, tablet, mobile computing device, or cellular telephone 54A, desktop computer 54B, laptop computer 54C, and/or automobile computer system 54N may communicate. Nodes 51 may communicate with one another. The nodes 51 may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 31 are intended to be illustrative only and that computing nodes 51 and cloud computing environment 50 can communicate with any type of computerized device over any type of network and/or network addressable connection (e.g., using a web browser). Each computing node may include computing components such as shown in FIG. 29 and/or FIG. 30.

Though embodiments have been described with reference to certain versions thereof; however, other versions are possible. Therefore, the spirit and scope of the embodiments should not be limited to the description of the preferred versions contained herein.

What is claimed is:

1. A computer-implemented method, executed on a computing device, comprising:
  receiving user inputs from a user relating to a real estate asset held directly or by a holding entity, the real estate asset being subject to undivided ownership, the user inputs including:
    an entity type giving rise to the undivided ownership in the real estate asset,
    a size of an undivided interest being valued,
    a number of parties having an undivided or fractional ownership interest in the real estate asset, and
    an estimated value of the real estate asset that is subject to the undivided ownership,
  receiving real estate data from one or more databases;
  receiving one or more initial logical inputs from the user via one or more logical adjustors;
  generating, via one or more empirically-developed transfer functions, an initial result set based, at least in part, upon the user inputs, the real estate data, and the initial logical inputs, the initial result set including a valuation of an undivided interest in the real estate asset held directly or by the holding entity, wherein generating the initial result set includes:
    performing a present value calculation of future benefits, cash flows, and an interest's pro rata share of NAV at an end of a restriction period;
    performing a present value calculation of future benefits, cash flows, and the interest's pro rata share of NAV at the end of the restriction period based on a risk-adjusted yield rate;
    performing a discounted present value based on partition calculation; and
    performing a control impairment calculation based on a REIT yield risk premium database; and
  presenting the initial result set to the user as real time valuation output including dynamically updating the initial result set in response to each received user input and presenting an updated real-time valuation in response to each user input as each user input is received.

2. The computer-implemented method of claim 1, wherein the one or more logic adjustors include one or more of:
  a real estate adjustor;
  a control adjustor;
  a time adjustor;
  a due diligence adjustor;
  a management risk adjustor;
  an other-risk adjustor; and
  a restriction period adjustor.

3. The computer-implemented method of claim 1, wherein generating an initial result set includes one or more of:
  performing a net asset value calculation;
  performing a monthly payment calculation for a fixed interest rate/declining balance type;

performing a cash flows calculation;
performing a Black-Scholes calculation.

4. The computer-implemented method of claim 1, wherein the one or more databases includes one or more of:
an entity and property type database;
a financial rates database;
a real estate rates database;
an empirical entity constants database;
a Black-Scholes constants database;
a partition constants database;
a control adjustment constants database;
an REIT yield database;
a restriction risk data database;
an empirical limit settings database; and
an empirical weighting constants and settings database.

5. The computer-implemented method of claim 1 further comprising:
receiving one or more revised logical inputs from the user via one or more logical adjustors.

6. The computer-implemented method of claim 5 further comprising:
generating a revised result set based, at least in part, upon the user inputs, the real estate data, and the revised logical inputs; and
presenting the revised result set to the user.

7. The computer-implemented method of claim 6, wherein generating a revised result set based, at least in part, upon the user inputs, the real estate data, and the revised logical inputs includes one or more of:
performing a net asset value calculation based, at least in part, upon the revised logical inputs;
performing a monthly payment calculation for a fixed interest rate/declining balance type based, at least in part, upon the revised logical inputs;
performing a cash flows calculation based, at least in part, upon the revised logical inputs;
performing a Black-Scholes calculation based, at least in part, upon the revised logical inputs;
performing a present value calculation of future benefits, cash flows, and an interest's pro rata share of NAV at an end of a restriction period based, at least in part, upon the revised logical inputs;
performing a present value calculation of future benefits, cash flows, and the interest's pro rata share of NAV at the end of the restriction period based on a risk-adjusted yield rate based, at least in part, upon the revised logical inputs;
performing a discounted present value based on partition calculation based, at least in part, upon the revised logical inputs;
performing a REIT yield database calculation based, at least in part, upon the revised logical inputs; and
assembling and reconciling various value indications using empirically-developed conditional functions.

8. A computer program product residing on a non-transitory computer readable medium having a plurality of instructions stored thereon which, when executed by a processor, cause the processor to perform operations comprising:
receiving user inputs from a user relating to a real estate asset held directly or by a holding entity, the real estate asset being subject to undivided ownership, the user inputs including:
an entity type giving rise to the undivided ownership in the real estate asset,
a size of an undivided interest being valued,
a number of parties having an undivided ownership interest in the real estate asset, and
an estimated value of the real estate asset that is subject to the undivided ownership,
receiving real estate data from one or more databases;
receiving one or more initial logical inputs from the user via one or more logical adjustors;
generating, via one or more empirically-developed transfer functions, an initial result set based, at least in part, upon the user inputs, the real estate data, and the initial logical inputs, the initial result set including a valuation of an undivided interest in the real estate asset held directly or by the holding entity, wherein generating the initial result set includes:
performing a present value calculation of future benefits, cash flows, and an interest's pro rata share of NAV at an end of a restriction period;
performing a present value calculation of future benefits, cash flows, and the interest's pro rata share of NAV at the end of the restriction period based on a risk-adjusted yield rate;
performing a discounted present value based on partition calculation; and
performing a control impairment calculation based on a REIT yield risk premium database; and
presenting the initial result set to the user as real time valuation output including dynamically updating the initial result set in response to each received user input and presenting an updated real-time valuation in response to each user input as each user input is received.

9. The computer program product of claim 8, wherein the one or more logic adjustors include one or more of:
a real estate adjustor;
a control adjustor;
a time adjustor;
a due diligence adjustor;
a management risk adjustor;
an other-risk adjustor; and
a restriction period adjustor.

10. The computer program product of claim 8, wherein generating an initial result set includes one or more of:
performing a net asset value calculation;
performing a monthly payment calculation for a fixed interest rate/declining balance type;
performing a cash flows calculation;
performing a Black-Scholes calculation.

11. The computer program product of claim 8, wherein the one or more databases includes one or more of:
an entity and property type database;
a financial rates database;
a real estate rates database;
an empirical entity constants database;
a Black-Scholes constants database;
a partition constants database;
a control adjustment constants database;
an REIT yield database;
a restriction risk data database;
an empirical limit settings database; and
an empirical weighting constants and settings database.

12. The computer program product of claim 8 further comprising:
receiving one or more revised logical inputs from the user via one or more logical adjustors.

13. The computer program product of claim 12 further comprising:

generating a revised result set based, at least in part, upon the user inputs, the real estate data, and the revised logical inputs; and presenting the revised result set to the user.

14. The computer program product of claim 13, wherein generating a revised result set based, at least in part, upon the user inputs, the real estate data, and the revised logical inputs includes one or more of:

performing a net asset value calculation based, at least in part, upon the revised logical inputs;

performing a monthly payment calculation for a fixed interest rate/declining balance type based, at least in part, upon the revised logical inputs;

performing a cash flows calculation based, at least in part, upon the revised logical inputs;

performing a Black-Scholes calculation based, at least in part, upon the revised logical inputs;

performing a present value calculation of future benefits, cash flows, and an interest's pro rata share of NAV at an end of a restriction period based, at least in part, upon the revised logical inputs;

performing a present value calculation of future benefits, cash flows, and the interest's pro rata share of NAV at the end of the restriction period based on a risk-adjusted yield rate based, at least in part, upon the revised logical inputs;

performing a discounted present value based on partition calculation based, at least in part, upon the revised logical inputs;

performing a REIT yield database calculation based, at least in part, upon the revised logical inputs; and assembling and reconciling various value indications using empirically-developed conditional functions.

15. A computing system including a processor and memory configured to perform operations comprising:

receiving user inputs from a user relating to a real estate asset held directly or by a holding entity, the real estate asset being subject to undivided ownership, the user inputs including:

an entity type giving rise to the undivided ownership, a size of an undivided interest being valued, a number of parties having an undivided ownership interest in the real estate asset, and an estimated value of the real estate asset that is subject to the undivided ownership, receiving real estate data from one or more databases;

receiving one or more initial logical inputs from the user via one or more logical adjustors;

generating, via one or more empirically-developed transfer functions, an initial result set based, at least in part, upon the user inputs, the real estate data, and the initial logical inputs, the initial result set including a valuation of an undivided interest in the real estate asset held directly or by the holding entity, wherein generating the initial result set includes:

performing a present value calculation of future benefits, cash flows, and an interest's pro rata share of NAV at an end of a restriction period;

performing a present value calculation of future benefits, cash flows, and the interest's pro rata share of NAV at the end of the restriction period based on a risk-adjusted yield rate;

performing a discounted present value based on partition calculation; and performing a control impairment calculation based on a REIT yield risk premium database; and presenting the initial result set to the user as real time valuation output including dynamically updating the initial result set in response to each received user input and presenting an updated real-time valuation in response to each user input as each user input is received.

16. The computing system of claim 15, wherein the one or more logic adjustors include one or more of:

a real estate adjustor;
a control adjustor;
a time adjustor;
a due diligence adjustor;
a management risk adjustor;
an other-risk adjustor; and
a restriction period adjustor.

17. The computing system of claim 15, wherein generating an initial result set includes one or more of:

performing a net asset value calculation;
performing a monthly payment calculation for a fixed interest rate/declining balance type;
performing a cash flows calculation;
performing a Black-Scholes calculation.

18. The computing system of claim 15, wherein the one or more databases includes one or more of:

an entity and property type database;
a financial rates database;
a real estate rates database;
an empirical entity constants database;
a Black-Scholes constants database;
a partition constants database;
a control adjustment constants database;
an REIT yield database;
a restriction risk data database;
an empirical limit settings database; and
an empirical weighting constants and settings database.

19. The computing system of claim 15 further comprising:
receiving one or more revised logical inputs from the user via one or more logical adjustors.

20. The computing system of claim 19 further comprising:
generating a revised result set based, at least in part, upon the user inputs, the real estate data, and the revised logical inputs; and
presenting the revised result set to the user.

21. The computing system of claim 20, wherein generating a revised result set based, at least in part, upon the user inputs, the real estate data, and the revised logical inputs includes one or more of:

performing a net asset value calculation based, at least in part, upon the revised logical inputs;

performing a monthly payment calculation for a fixed interest rate/declining balance type based, at least in part, upon the revised logical inputs;

performing a cash flows calculation based, at least in part, upon the revised logical inputs;

performing a Black-Scholes calculation based, at least in part, upon the revised logical inputs;

performing a present value calculation of future benefits, cash flows, and an interest's pro rata share of NAV at an end of a restriction period based, at least in part, upon the revised logical inputs;

performing a present value calculation of future benefits, cash flows, and the interest's pro rata share of NAV at the end of the restriction period based on a risk-adjusted yield rate based, at least in part, upon the revised logical inputs;

performing a discounted present value based on partition calculation based, at least in part, upon the revised logical inputs;
performing a REIT yield database calculation based, at least in part, upon the revised logical inputs; and
assembling and reconciling various value indications using empirically-developed conditional functions.

* * * * *